(12) United States Patent
Murray et al.

(10) Patent No.: US 12,280,950 B2
(45) Date of Patent: Apr. 22, 2025

(54) SOW CASTING AUTOMATED GUIDED VEHICLE

(71) Applicant: STAS INC., Chicoutimi (CA)

(72) Inventors: Joel Murray, Berwick (CA); Nicolas Bauret, St-Honoré de Chicoutimi (CA); Caroline Boily, Laterrière (CA); Jean-Michel Tremblay-Goupille, Jonquiere (CA)

(73) Assignee: Stas Inc., Chicoutimi (CA)

( * ) Notice: Subject to any disclaimer, the term of this patent is extended or adjusted under 35 U.S.C. 154(b) by 0 days.

(21) Appl. No.: 18/771,594

(22) Filed: Jul. 12, 2024

(65) Prior Publication Data

US 2024/0359916 A1  Oct. 31, 2024

Related U.S. Application Data

(63) Continuation of application No. PCT/CA2023/051577, filed on Nov. 24, 2023.

(60) Provisional application No. 63/447,448, filed on Feb. 22, 2023, provisional application No. 63/428,005, filed on Nov. 25, 2022.

(51) Int. Cl.
  *B22D 33/00* (2006.01)
  *B22D 47/00* (2006.01)
  *B65G 1/04* (2006.01)

(52) U.S. Cl.
  CPC ........... *B65G 1/0492* (2013.01); *B22D 33/00* (2013.01); *B22D 47/00* (2013.01)

(58) Field of Classification Search
  CPC .......... B22D 33/00; B22D 47/00; B65G 1/04; B65G 1/0492

USPC .......................... 164/129, 130, 322, 323, 324
  See application file for complete search history.

(56) References Cited

U.S. PATENT DOCUMENTS

| | | | | |
|---|---|---|---|---|
| 5,533,562 A | * | 7/1996 | Moschini et al. | ..... B22D 25/06 164/113 |
| 10,106,383 B2 | | 10/2018 | Shen et al. | |
| 10,315,902 B2 | * | 6/2019 | Xu | .......... B66F 11/046 |
| 2002/0074700 A1 | * | 6/2002 | Mansell | .............. C22B 21/0092 266/213 |
| 2012/0179337 A1 | | 7/2012 | Doan | |
| 2016/0282451 A1 | | 9/2016 | Hartman et al. | |
| 2020/0073402 A1 | | 3/2020 | Brucker et al. | |

(Continued)

FOREIGN PATENT DOCUMENTS

| | | |
|---|---|---|
| CN | 105502210 | 4/2016 |
| CN | 108068097 | 5/2018 |

(Continued)

OTHER PUBLICATIONS

Boscarato, Matteo, Development of Path Planning Algorithms for AGVs in the Primary Aluminium Industry Padua Thesis and Dissertation Archive Apr. 8, 2022 https://hdl.handle.net/20.500.12608/22991.

*Primary Examiner* — Kevin P Kerns
(74) *Attorney, Agent, or Firm* — Benoit&Cote Inc.; Mathieu Audet

(57) ABSTRACT

An automated guided vehicle (AGV) including a frame, ground-contacting elements connected to the frame for supporting the AGV and a heat shield is used in an automated sow casting facility. AGVs are adapted to get hold of, to move and to release moulds used for producing sows. A method of operating the casting facility involving AGVs to move moulds between stations is also described.

20 Claims, 25 Drawing Sheets

(56) References Cited

U.S. PATENT DOCUMENTS

| | | |
|---|---|---|
| 2020/0307973 A1 | 10/2020 | Kozlenok |
| 2021/0170903 A1 | 6/2021 | Tsuchiya et al. |
| 2021/0229265 A1 | 7/2021 | Xie et al. |
| 2022/0155764 A1 | 5/2022 | Louie et al. |

FOREIGN PATENT DOCUMENTS

| | | |
|---|---|---|
| CN | 108995744 | 12/2018 |
| CN | 109334814 | 2/2019 |
| CN | 109594813 | 4/2019 |
| CN | 110562351 | 12/2019 |
| EP | 3960590 | 3/2022 |
| EP | 3978419 | 4/2022 |
| WO | 2018102927 | 6/2018 |

\* cited by examiner

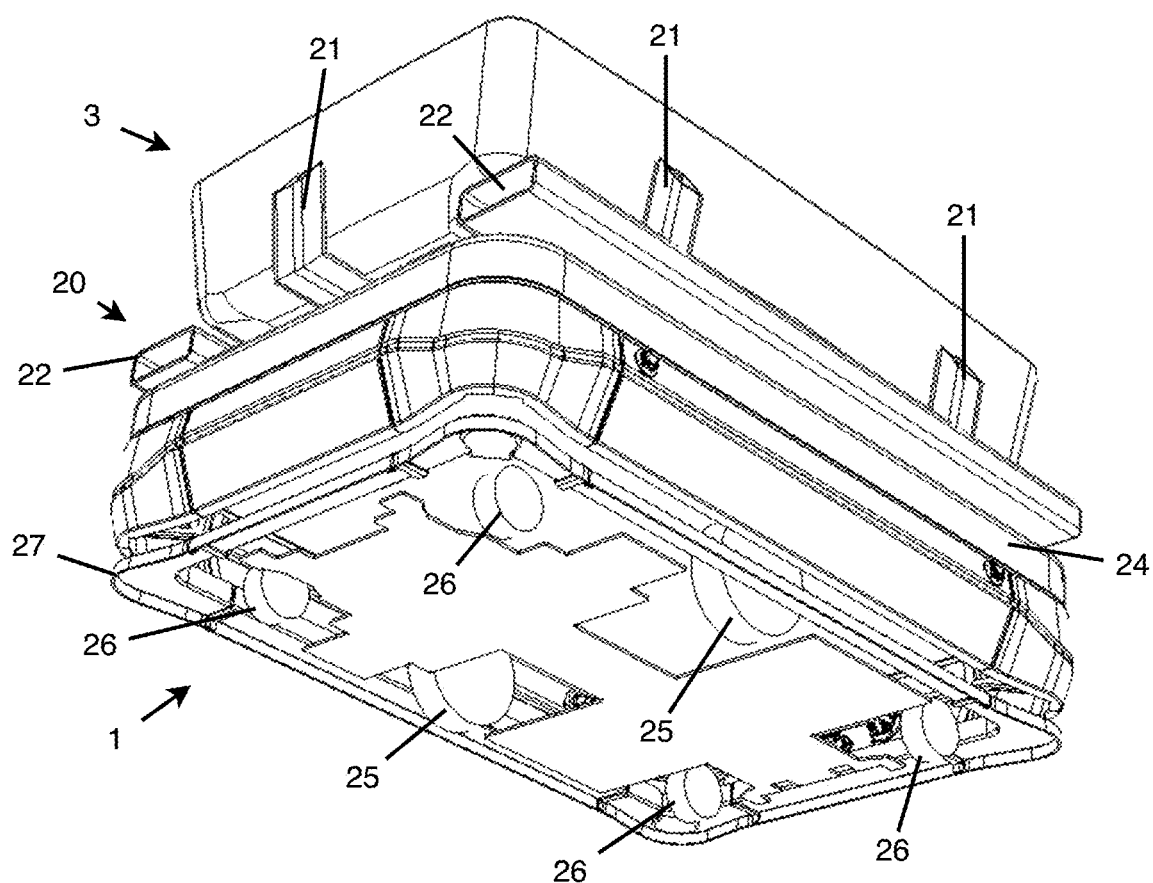
Fig. 23
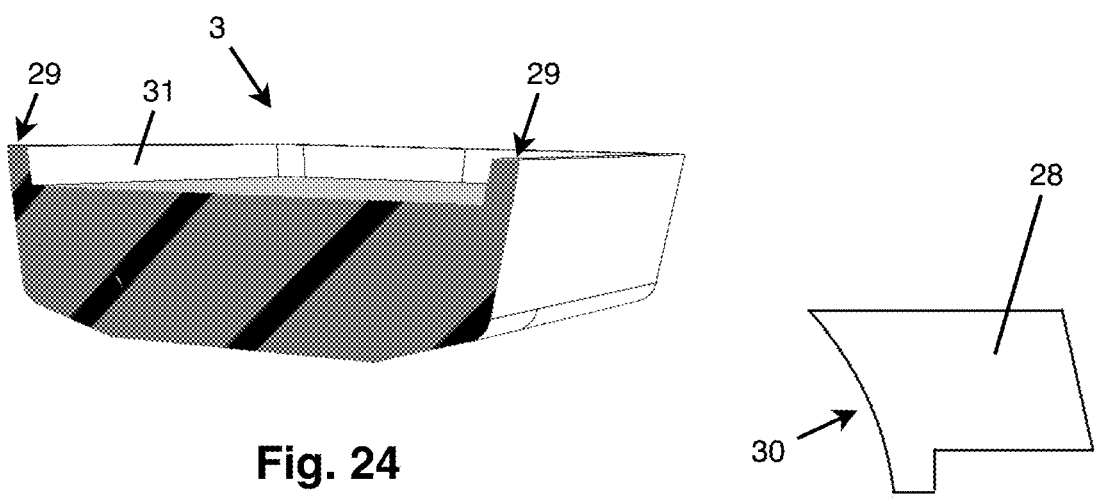
Fig. 24
Fig. 25

SOW CASTING AUTOMATED GUIDED VEHICLE

CROSS-REFERENCE TO RELATED APPLICATION

This application relates to and is a continuation application claiming priority under 35 U.S.C. § 119(a)-(d) and 37 C.F.R. § 1.55 from PCT patent Application Ser. No. PCT/CA2023/051577, entitled SOW CASTING AUTOMATED GUIDED VEHICLE, filed Nov. 24, 2023, published under WO 2024/108309 on May 30, 2024, which '577 Application relates to and is a PCT application claiming priority from U.S. provisional Patent Application Ser. No. 63/428,005, filed Nov. 25, 2022, entitled SOW CASTING AUTOMATIC GUIDED VEHICLE, and from U.S. provisional Patent Application Ser. No. 63/447,448, filed Feb. 22, 2023, entitled SOW CASTING AUTOMATIC GUIDED VEHICLE, these specifications are hereby incorporated herein by reference in their entireties.

BACKGROUND

(a) Field

The subject matter disclosed generally relates to Automatic Guided Vehicle (AGV) with improved capabilities adapted for sow casting processes.

The subject matter disclosed generally relates to improvement in the system, environment, complementary components and method of production of aluminium sows related to the improvements in AGVs and operations of AGVs for the production thereof.

(b) Related Prior Art

Aluminium smelters and aluminium recycling facilities produce solidified aluminium products in multiple forms and alloys so they can be transported safely to other locations where they are destined for a variety of applications. Products that do not resemble their final form and are designed to be completely remelted before being formed into their final shape are called "remelt products". For re-liquified products, the shape yields little added value other than ease of transport and manipulation, and so a high priority is to solidify the metal in a method which is as inexpensive as possible.

A common method of creating remelt products is by casting sows: large blocks of metal, often of weight of at least 100 kg, and commonly between 400 kg and 900 kg, with a particular shape which benefits solidification, mould release, its handling by forklift and easy stacking. The modern automated versions of these sow casting machines comprise a round or oval set of carriages that moves moulds along a track, bringing them from one station to the next. All the moulds are supported on supporting trolleys which are interlinked to form a chain, thereby providing no control over movement of individual moulds. Furthermore, removing and replacing moulds, which are a consumable part, generally requires stopping production and necessarily requires human intervention.

Sow ingot casting (sow casting) differs from smaller "pig" ingot casting (ingot casting) predominantly in the size of the aluminium ingot produced. Ingot casting refers to metal products that weight in the range of 5 kg-25 kg, with a further common division of 5 kg-15 kg for alloy ingots and 20 kg-25 kg for primary P1020 aluminium ingots.

Sow casting refers to solidified aluminium products having significantly greater weight than 100 kg, typically 400 kg-800 kg. This can be for alloy or P1020 aluminium but most commonly produces primary P1020 aluminium sows. Sows generally are not designed to interlock and form a larger strapped bundle, unlike ingots. Due to their large size and low-profile shape, sows are generally stacked on top of each other without strapping. The design of the sow shape accommodates this by incorporating forklift pickup locations into the shape of each sow.

Sow casting can generally be divided into three styles:
1. Manual sow casting
2. Water cooled sow casting machines
3. Air cooled sow casting machines 1. Manual Sow Casting FIG. 2 depicts a typical manual pouring system.

Moulds are placed in a stationary location and aluminium is manually poured into them via a crucible, pouring spout or some other pouring assisted device. At the end of a pour, the pouring device is moved to another empty sow, or the sow is removed and replaced by another empty mould. The full mould is either transferred to a cooling location or remains in its position until solidified and ready for removal.

This is a highly labour-intensive process. It is generally used infrequently, only when excess liquid aluminium needs to be processed. Due to its reliance on operator input, variations arise in the resultant products dependent upon the operator. The close proximity of operators to key hazardous operations also arises safety implications.

2. Water Cooled Sow Casting Machines

FIG. 3 depicts a typical water-cooled sow casting machine.

The process of sow casting became automated or semi-automated through the use of a circular carriage to which a series of moulds are mounted. This carriage often looks like a rigid circular disk that, through its rotation, would index the moulds from one position to the next after the operations being completed. Metal is poured in at a particular position or "station", in the circular disk. The disk and moulds would then increment to the following position where another operation could be performed, or cooling could occur. Prior to the full mould 3 returning to its starting position, the sow is demoulded and relevant preheat occurs.

This system allowed for a level of automation therefore not as reliant upon operator input to start and stop pouring for each mould. It is compact, due in part to water cooling, although the internal area of the disk is rarely used productively.

This type of sow casting machine has safety issues due to having water present where are poured large quantities of aluminium. Water may be present in the base of the mould before pouring or come through the mould if there is a failure in the mould that is unreported. Water being entrapped by liquid aluminium is a major safety hazard for both operators and nearby equipment.

Furthermore, the moulds are placed around the edge of the circular disk, so large capacity machines require a large disk, which increase the difficulty to manipulate and yields more wasted space in the centre of the disk where there are no moulds.

3. Air-Cooled Sow Casting Machines

FIG. 4 depicts a typical air-cooled sow casting machine.

Air-cooled sow casting machines have become common for sow casting machines of a capacity of above approximately 10 tonnes per hour. They utilise air cooling through forced air cooling, radiant heat transfer and natural convection. Moulds are positioned each on its own movable trolley.

The trolleys are interconnected to move simultaneously around a track. Similar to the water-cooled type, specific operations occur at set positions, aka stations, around the track. Preheating of moulds occurs prior to the pouring position. Once the sows are poured, liquid sows are then skimmed at a nearby downstream position before the filled moulds travel along the track, solidifying and cooling. Cooling can occur through forced air methods or through natural heat transfer. Prior to returning to the preheaters, the solidified sow is removed from the mould for processing.

The air-cooled type is beneficial when compared with the water-cooled type in featuring improved safety conditions due to the area being free of water. The equipment can be fully automated to ensure that consistent products are produced. It also reduces the personnel requirements, as well as removing them from the hazardous areas.

The capacity of air-cooled machines is often higher than the water-cooled machines, as the main limiting factor is the cooling capacity, with said capacity being possible to be increased during the design stages. For higher capacity machines, there is a shorter cycle time and hence need for an increase in the number of positions between the pouring position and the demoulding position. As a result, air-cooled sow casting machine features more moulds, more trolleys, and therefore have a larger footprint. As a consequence, machine capacity is limited by the space available and if the task required to be performed at a location is able to be completed in time.

These air-cooled sow casting machines can produce safe, consistently sized ingots in a high capacity and automated manner. It allows for a simple and lower cost solution through which liquid aluminium is processed and formed into a shape that is suitable for transport.

This prior art technology, however, has limitations. The cooling is limited to the time the full moulds spend on the track between pouring and demoulding positions. Hence, the cooling process is spread out over a large area.

The track supports interconnecting trolleys which traditionally are in the shape of a rectangle with large radii corners for the trolleys to be able to be pulled around. This configuration results in a large area in the center of the track that is unused.

The mould trolleys are interconnected, so the trolleys are all consistently indexed as each subsequent mould is poured. Hence, at every cycle the moulds are accelerated and decelerated, which disturbs the top surface of a non-solidified sow, impacting the quality of the sow. The movement also results in risks of derailment of the trolley chain.

As the equipment is all interlinked, the capacity is dependent upon the critical function that is the operation of a position having the longest performance time of the cycle. Often, this is the pouring or cooling position that, as such, determines the capacity of the entire machine. Changes in capacity are extremely limited and costly, as they require to modify the entire machine to suit the novel characteristics.

The mould trolleys are moving. Hence, each of these support structures for the moulds requires high precision manufacturing in order to form the interlinked chain.

If there is a problem with any part of the machine, it impacts all moulds and trolleys. If there is a problem with a particular position, then the entire machine is either shut down, or all moulds bypass that position until remedied.

Since each mould and trolley move in a continuous path between each functional station, the functions must incorporate the trolley and track system in its design. Therefore, the stations must allow trolleys and moulds to come into and out of the region of this station, compromising cost and functionality of the station itself.

The prior art types of sow casters perform adequately but often have wasted space and are difficult to modify at a later date. They are designed to cast at a particular capacity, becoming inefficient when required to cast at lower capacities. In addition, the moulds are interlinked so stoppages or complications are impacting the entire production line.

SUMMARY

This patent application describes a process of fully integrating automated guided vehicles (AGVs) as part of the machine to move sow ingot moulds from one location to the next. This replaces the circular chain and trolley system of a conventional sow caster.

This process allows for a greatly reduced footprint, has an infinite adaptability to the layout, has a decreased installation time, is retrofittable to augment future capacity changes, has greater flexibility of production speed, and has reduced start-up time from cold. Furthermore, this process allows to avoid some costs associated with nowadays available systems.

In some aspects, the description herein relates to a method for producing sows from liquid metal poured in moulds, the method includes: having a number of at least three stations for performing different tasks in the producing of sows, each one of the stations having a dedicated position and operating at a dedicated rate in terms of number of sows per time unit, wherein, during the production of sows, tasks relative to producing sows are performed in a pre-set order; having a plurality of moulds movable between the dedicated positions of the stations; and having a number of Automated Guided Vehicles (AGVs) capable of independently moving between the stations, the AGVs being able to move any of the moulds from any one of the dedicated positions of the stations to any other one the dedicated position of the stations.

In some aspects, the description herein relates to a method, wherein AGVs can get hold of one of the moulds located at the first dedicated position, move the held mould to a second one of the dedicated positions, and release the held mould at the second one off the dedicated positions.

In some aspects, the description herein relates to a method, further including having at a moment in time a first number of the moulds located at a first one of the stations, a second number of the moulds located as a second one of the stations, and a third number of the moulds located at a third one of the stations, wherein at least one of the first number, the second number and the third number is at least 2.

In some aspects, the description herein relates to a method, further including having less AGVs than the plurality of moulds.

In some aspects, the description herein relates to a method, further including having a buffer station wherein a first one of the moulds is moved therein after a second one of the moulds, and is leaving the buffer station before the second mould.

In some aspects, the description herein relates to a method, further including having a first one of the AGVs moving a first one of the moulds to and releasing the first mould at the first station, and a second one of the AGVs getting hold of the first mould at the first station and moving the first mould away from the first station.

In some aspects, the description herein relates to a method, wherein the AGVs include a raising top, wherein by raising and lower the top, the AGVs are able to get hold of and release the moulds.

In some aspects, the description herein relates to a method, wherein the AGVs include at least two ground-contacting driving wheels and at least four additional ground-contacting wheels.

In some aspects, the description herein relates to a method, wherein the ground-contacting driving wheels of the AGVs are independently motorized.

In some aspects, the description herein relates to a method, wherein the ground-contacting driving wheels of the AGVs can drive in opposite direction.

In some aspects, the description herein relates to a method, wherein one of the stations includes a stationary robot.

In some aspects, the description herein relates to a method, further including support structures on which can be put individually a held one of the moulds, the support structure including upwardly extending prongs for hindering horizontal movements of the held mould.

In some aspects, the description herein relates to a method, wherein the AGVs can get hold of the held mould by lifting one of the support structures holding the held mould.

In some aspects, the description herein relates to a method, wherein the support structures include legs configured to provide space underneath for any one of the AGVs to take place underneath.

In some aspects, the description herein relates to a method, wherein the AGVs can get hold of the held mould by lifting one of the support structures such that the legs lose contact with ground.

In some aspects, the description herein relates to a method, wherein a first one of the support structures, when held by a first one of the AGVs, spaces apart a first one of the moulds held in the first support structure from the first AGV.

In some aspects, the description herein relates to a method, wherein the AGVs and the stations are operated automatically.

In some aspects, the description herein relates to a method, wherein one of the stations is a preheating station including a closable heated internal compartment, wherein the internal compartment is closed between two tasks of preheating a first one and a second one of the moulds, thereby saving energy.

In some aspects, the description herein relates to a method, wherein the stations take place in an environment having a layout, the layout including a station-free area connecting the stations and used by the AGVs to move between stations.

In some aspects, the description herein relates to a method, further including setting up a first one of the AGVs in a charging state, and cooling up the first AGV during the charging state. Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIGS. 5A and 5B are isometric views of components involved in the operation of pouring, wherein FIG. 5A depicts moulds before any pouring, and FIG. 5B depicts when the pouring occurs;

FIGS. 8A and 8B are depictions of a general layout of a demoulding station in accordance with an embodiment, wherein FIG. 8A depicts demoulding the sow, and FIG. 8B depicts weighing the sow;

FIG. 23 is a bottom oblique perspective view of an AGV holding a mould on a support structure in accordance with an embodiment;

FIG. 24 is a perspective cross-section view of a mould with liquid metal in accordance with an embodiment;

FIG. 25 is a cross-section view of a portion of a spill-breaking ring in accordance with an embodiment;

It will be noted that throughout the appended drawings, like features are identified by like reference numerals.

DETAILED DESCRIPTION

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as," or the like) provided herein, is intended merely to better illuminate the exemplary realizations and does not pose a limitation on the scope of the realizations. No language in the specification should be construed as indicating any unclaimed element as essential to the practice of the realizations.

In the following description, it is understood that terms such as "first", "second", "top", "bottom", "above", "below", and the like, are words of convenience and are not to be construed as limiting terms.

The terms "top", "up", "upper", "bottom", "lower", "down", "vertical", "horizontal", "interior" and "exterior" and the like are intended to be construed in their normal meaning in relation with normal mode of operation.

Figure 1A:
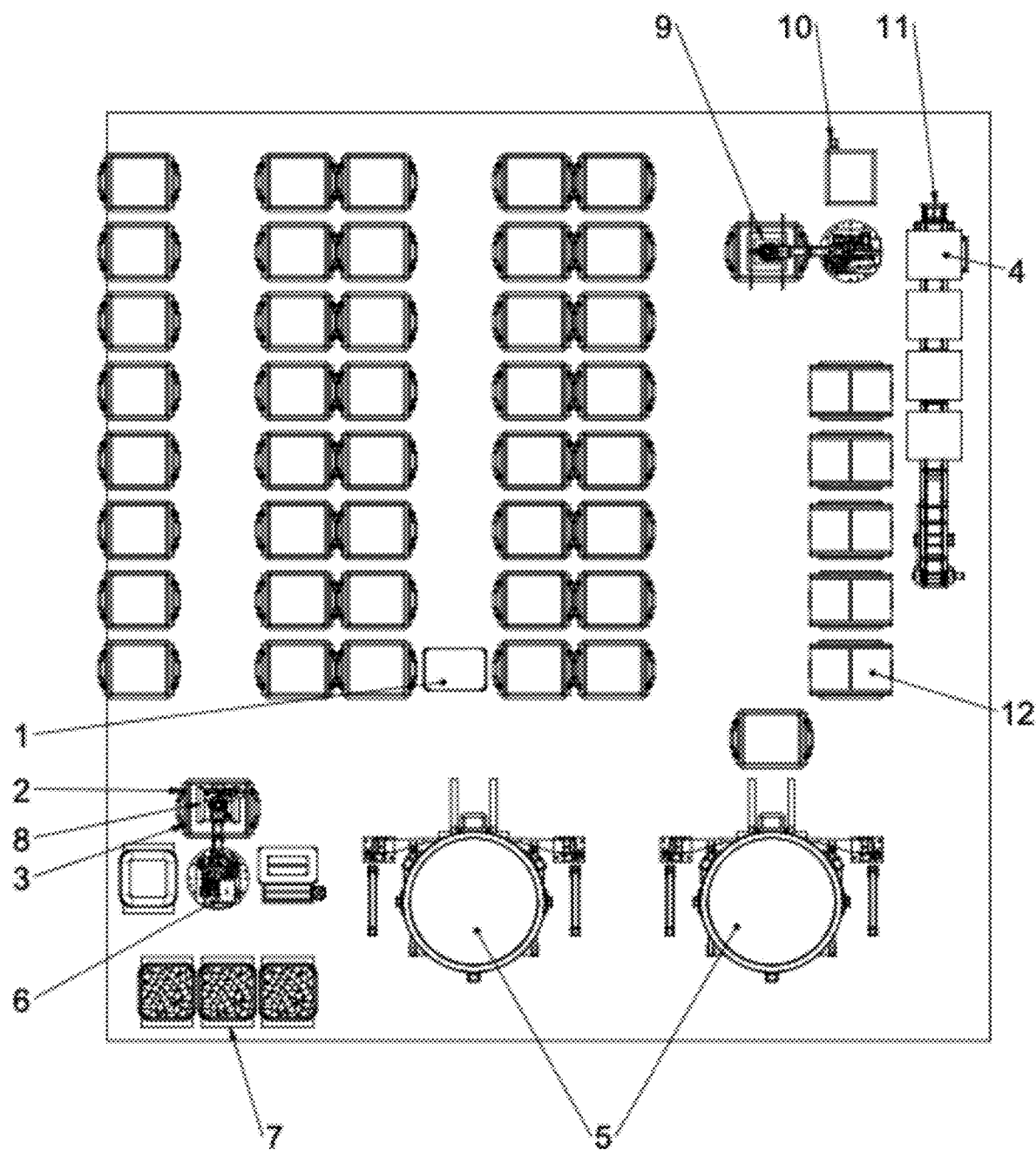
FIG. 1A is a plan view of a general layout of a sow casting system in accordance with an embodiment.
Figure 1B:
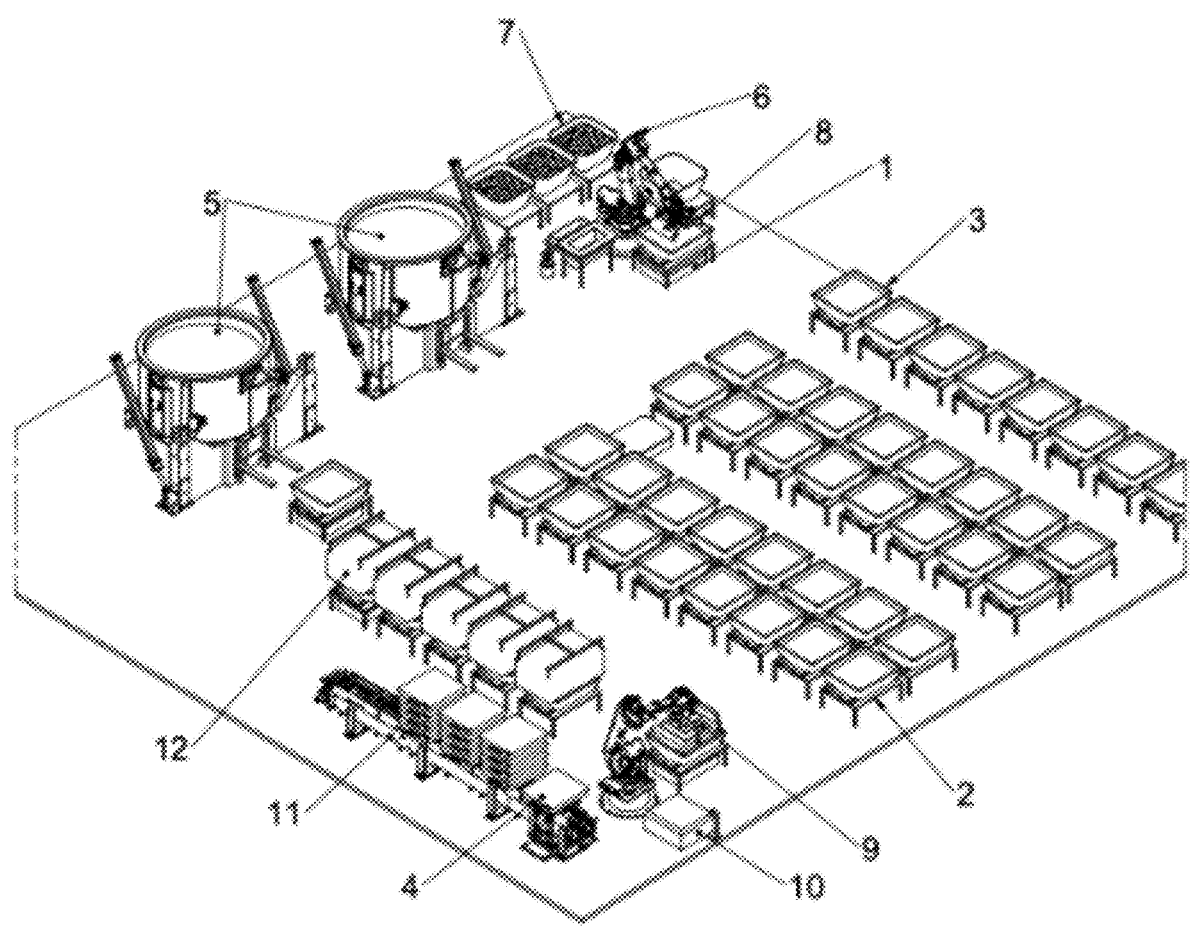
FIG. 1B is an isometric perspective view of a general layout of a sow casting system in accordance with an embodiment.
Figure 2:
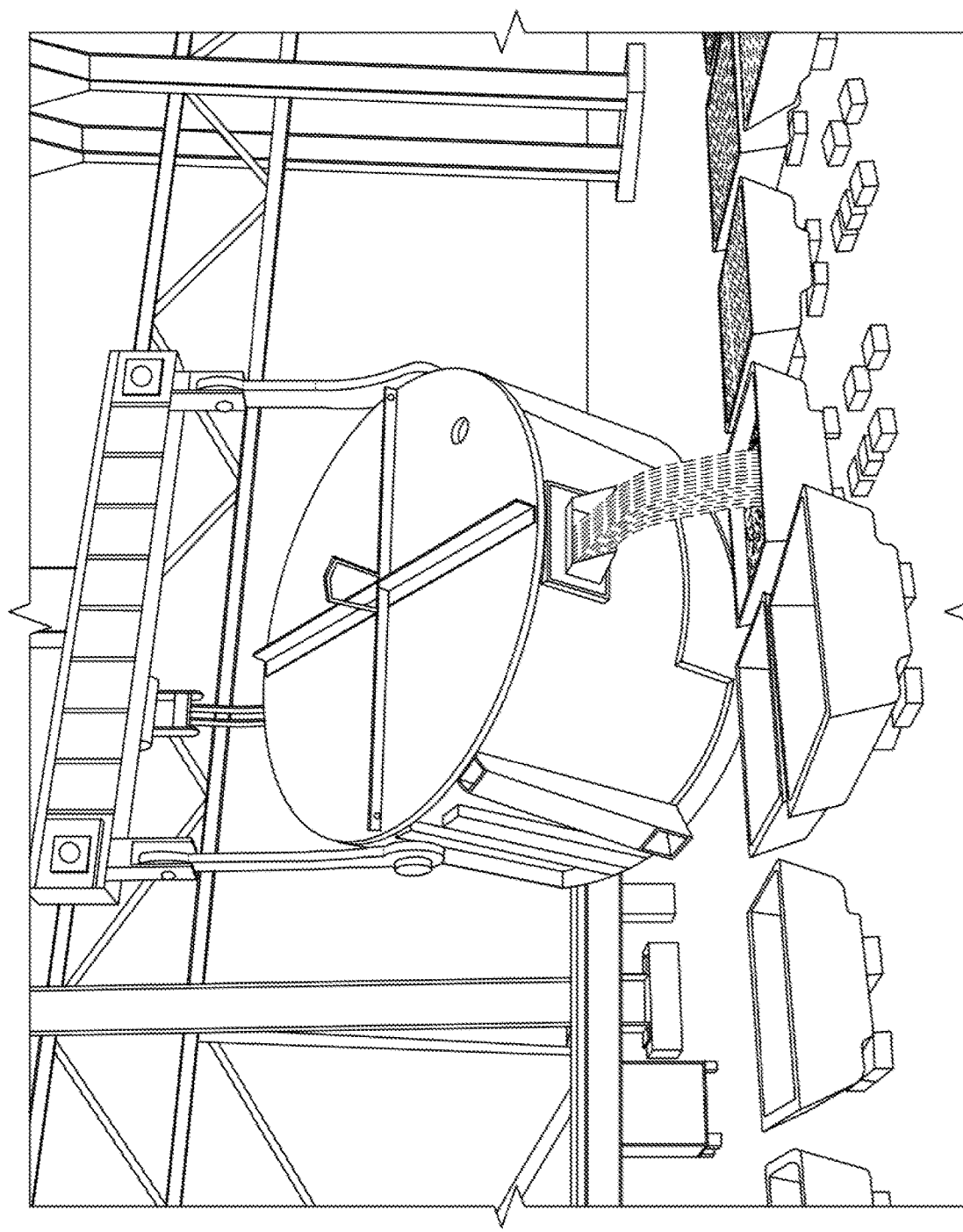
FIG. 2 is a depiction of a manual pouring system for pouring sows of the PRIOR ART.
Figure 3:
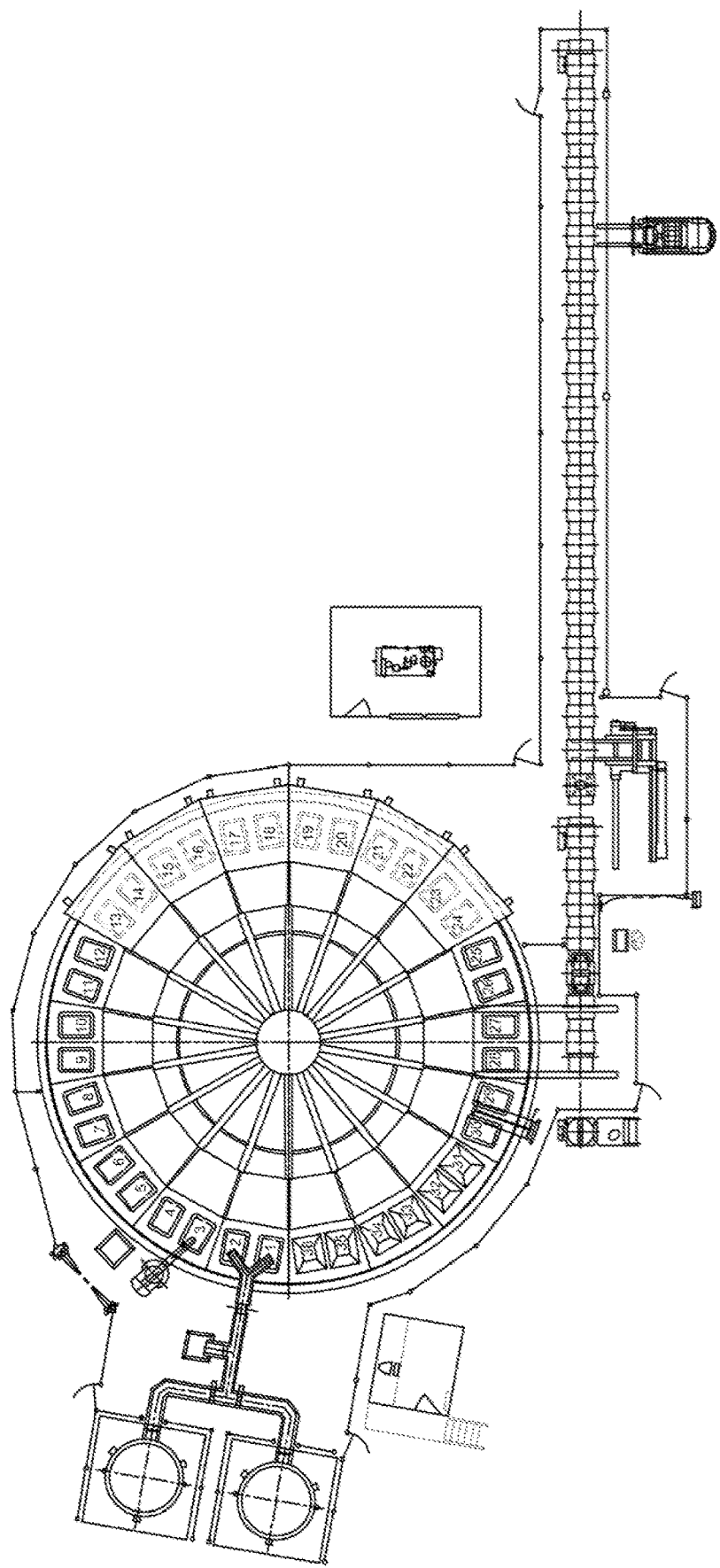
FIG. 3 is a depiction of a typical water-cooled sow casting machine of the PRIOR ART.
Figure 4:
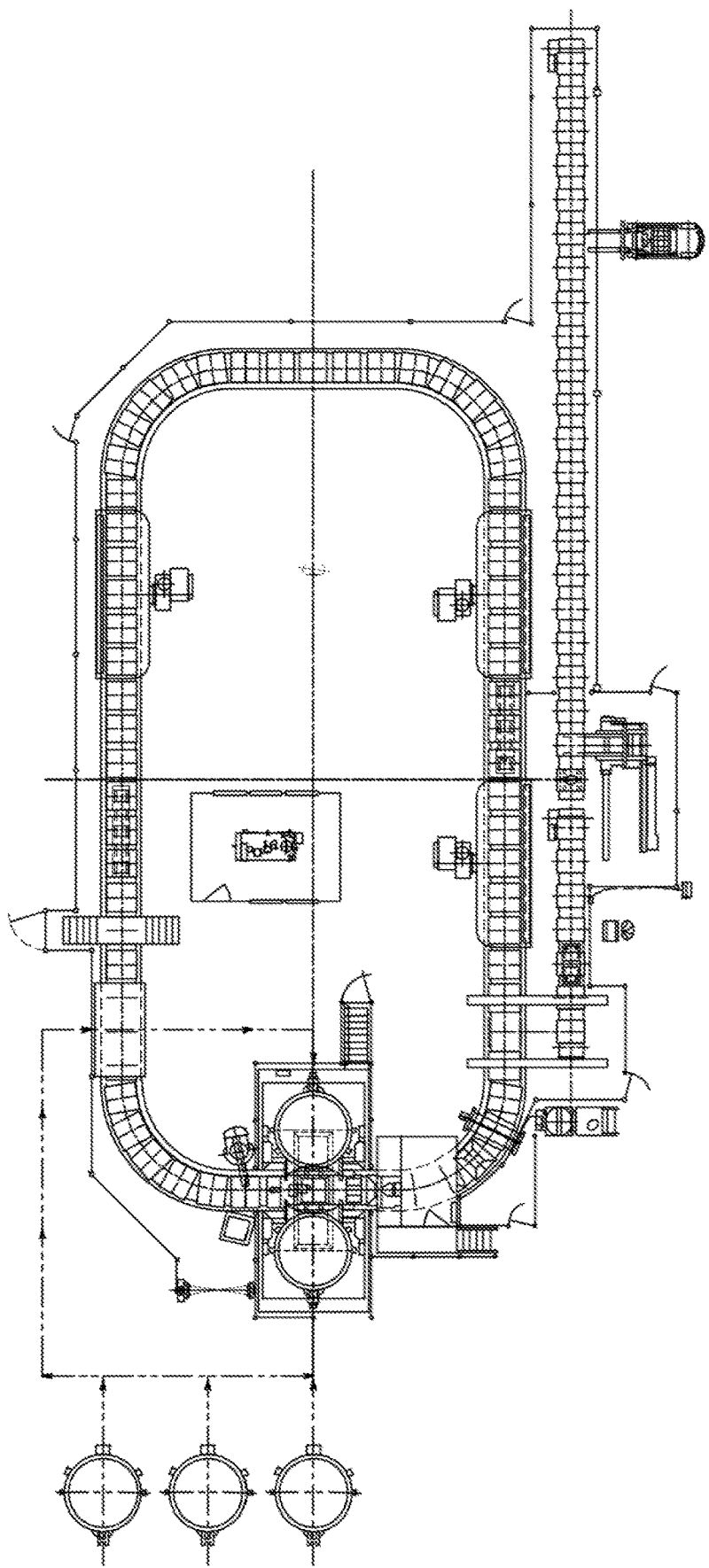
FIG. 4 is a depiction of a typical air-cooled sow casting machine of the PRIOR ART.
Figure 5A:
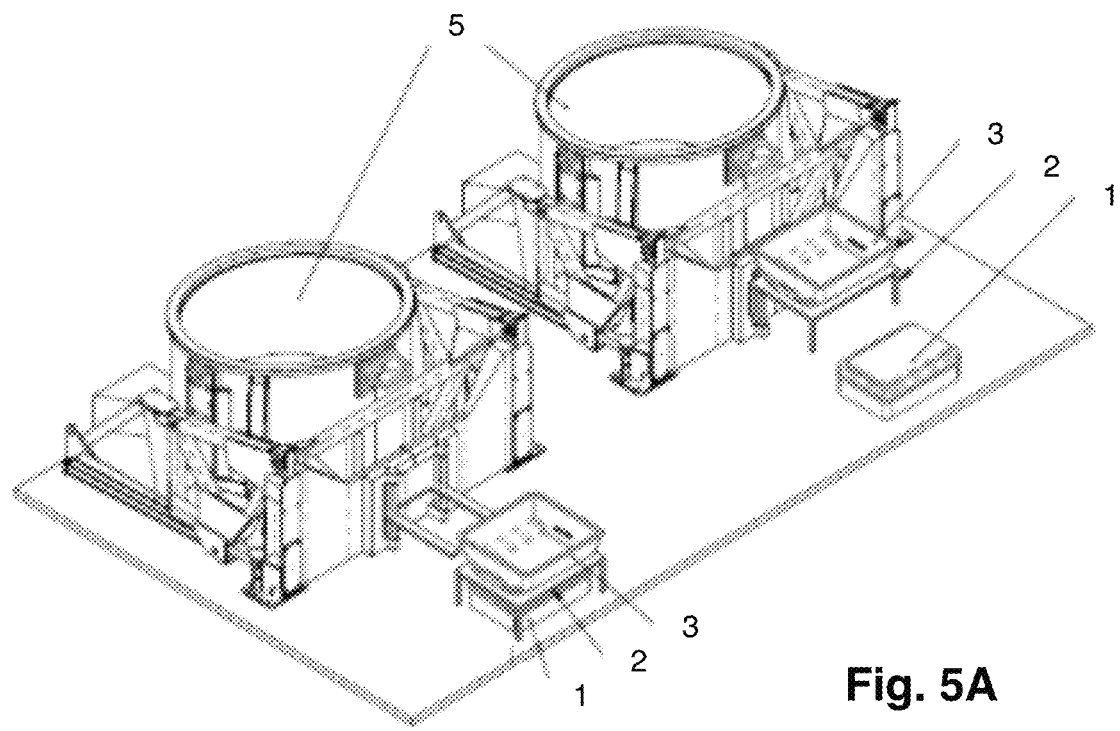
Figure 5B:
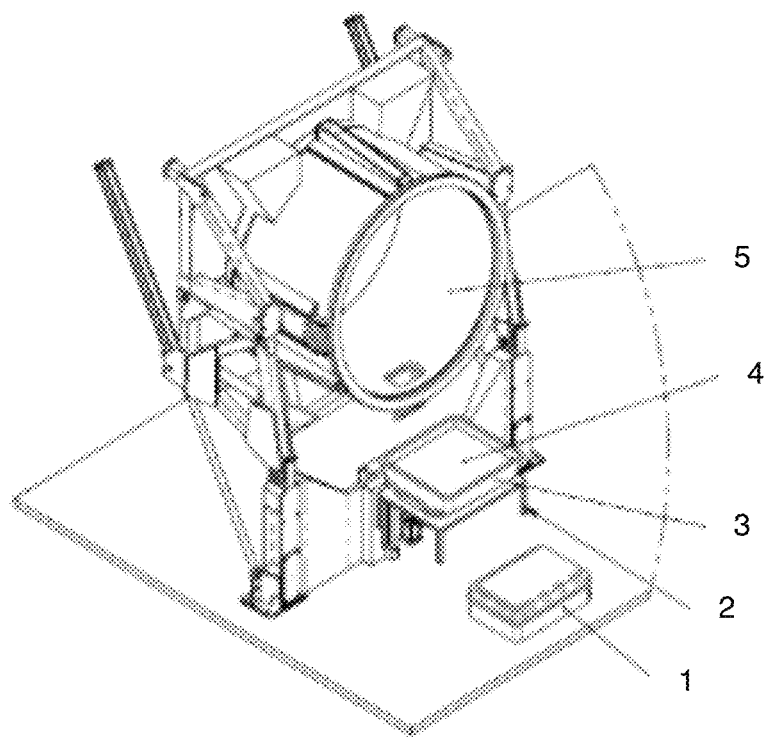

Referring now to the drawings, and more particularly to FIGS. 1A and 1B showing a first exemplary general layout with different parts participating in the innovation in an exemplary general layout in accordance with an embodiment.

Figure 20:
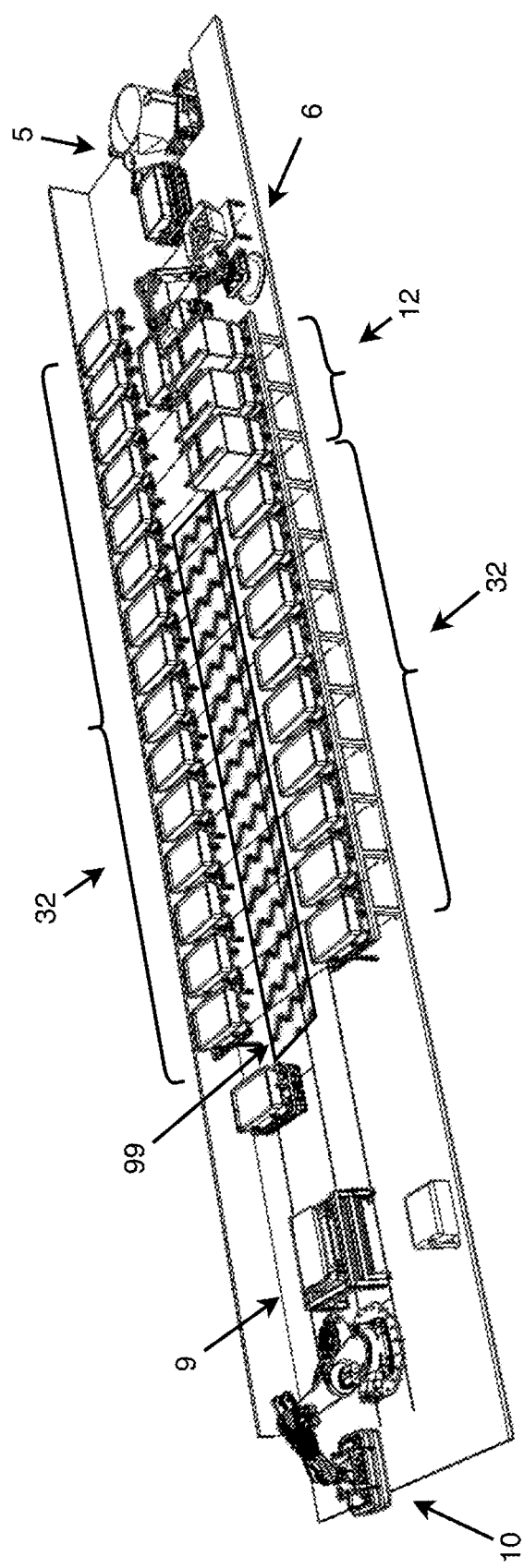
FIG. 20 is a perspective view of an alternative layout of a system in accordance with an embodiment.

A second exemplary general layout stressing the scope of available variation between acceptable layouts is further provided through FIG. 20 using a single-axis station-free area configuration.

Not depicted, additionally, various stations to support AGVs 1 and general operation preferably present, such as: AGV charging station(s); Safety fencing with automated entries and exits for AGVs 1; Mould temperature monitoring; and Power units.

The process of casting aluminium into sows 4 requires distinct operations that need to be performed:

Preheating of moulds 3 to remove moisture from moulds 3 and obtain an appropriate temperature for pouring;

Pouring of liquid metal into sows 4;

Skimming of poured liquid aluminium in sow moulds 3;

Cooling of liquid metal in moulds 3 to become solidified sows 4;

Removal of sows 4 from moulds 3; and

Processing of sows 4, comprising weighing of individual sow 4; determining of sow quality; marking of sows 4; stacking of sows 4; and presenting of sow stacks for removal.

Innovation concerns at least the operations of relates to the processing of the moulds 3 and the sows 4 housed therein. According to an aspect, the focus on the processing of sows 4 after they are removed from their moulds 3 is limited, nevertheless of such other steps being strongly impacted by the innovation.

Mould 3 are conceived to rest on and be supported individually by a support table 2. Support tables 2 are designed to support with and volume of one mould 3 and to allow an AGV 1 to lift the support table 2 from underneath and carry the table 2, mould 3, and sow 4 in the same movement.

Alternatively, moulds 3 can be lifted and moved directly by the AGV 1 which then eliminates the need for an intermediate support table 2. In such arrangement, mould support structures are located at the destinations so that moulds 3 can be dropped off and the AGV 1 can move on to manipulating other moulds 3.

Individual movement of specific moulds 3, sows 4 and optional support table 2 and sow 4 allows for great control and flexibility in how the sows 4 are transported within the area, especially when compared to the prior art. Therethrough, a large single movement of indexing moulds 3 around a circuit of the PRIOR ART is replaced by smaller, individual movements of moulds 3 as is required for that particular sow 4.

AGVs 1 of the present innovation can avoid columns and pillars. AGVs 1 can go around walls or fences. Hence, the present innovation does not require a specific shape of building like other sow casting machines of the PRIOR ART. It is versatile and makes good use of valuable available space in smelter or recycling facilities. The AGVs, through their capacity to move individually and their versatility, allow use of a compact cooling mechanism of the sows 4 without track and thus with no space without purpose in the center of the track, and thus allowing optimisation of valuable space.

Therefore, embodiments of the present innovation differ from the known prior art in at least the one or more of the following characteristics:

- Transporting liquid in an open mould 3 on an AGV 1;
- Independently processing moulds 3, e.g., managing moulds 3 through various steps (preheating, pouring, skimming, cooling, demoulding, etc.);
- Modularising tasks so individual functions are performed at different and independent stations;
- Providing flexibility to the processing steps, including flexibility in mould movements and process tasks, allowing avoiding tasks being performed unnecessarily;
- Easily replacing moulds 3, between and during operations;
- Allowing to increase production capacity of an existing facility by adding further elements;
- Dedicating areas to high-density cooling stations; and
- Having moulds 3 in a predominantly stationary state during solidification and cooling period of the material in the moulds.

Pouring Station

Referring now to FIGS. 1A-B and FIGS. 5A-B, a general layout of a pouring station operating with an AGV 1 is depicted with associated components.

The pouring station is where the liquid metal is transferred from a holding device into moulds 3.

Variable methods are available for this task, such as pouring directly from a crucible via a crucible tilter as depicted, pouring via a furnace and launder system, manual pouring, or via a pre-weighed temporary holding method. The common method is the crucible tilter, as crucibles are used in most aluminium smelters, it can be automated, is cost effective, and is reliable. Such capability of the crucible tilter is provided through fine control of tilting mechanisms.

Method and associated system of the present innovation can utilise similar pouring methods, but, through the use of AGVs 1, is advantageous. Pouring devices are typically stationary, with AGVs bringing moulds 3 to pouring stations 5 for filling. During pouring, AGVs 1 can either wait (e.g., idle mode) until the mould 3 is filled or go perform a different function until the filled sow 4 is ready for removal. Another AGV 1 may take the relay. When moulds 3 are filled with the prescribed quantity of liquid metal, filled moulds 3 are individually picked up by AGVs 1 and taken to a skimming station.

Moulds 3 are moved to the pouring station individually on AGVs 1 rather than (with PRIOR ART) being on a track that must pass underneath the pouring point. Hence, rather than with the PRIOR ART in which sides of pouring station 5 needs to be kept clear for incoming and outgoing moulds, moulds 3 transported by AGVs 1 can exit from the same direction as they used to access the station. Hence, with the present innovation the pouring structure and layout is simplified and better supported on more sides.

Furthermore, individual mobility of sows allows the pouring station 5 to be distant from locations dedicated to other operations, provided that the skimming process is done within an appropriate delay. This provides flexibility of layouts in smelters or recycling facilities and, when using enough AGVs 1, allowing movements between different parts of the smelter or facility.

With an automated machine of the PRIOR ART, pouring location is set in a single position with skimming required to be set aside, since required to occur immediately thereafter. However, if a single crucible tilter is installed, then additional downtime is required due to crucible changeovers. At each changeover period, empty crucible tilters need to be lowered, the clamps removed, the empty crucible removed, the new full crucible aligned and lowered onto the tilter, the clamps engaged, and the tilter lifted ready for pouring. This process takes time, usually many minutes. For smaller crucibles, this changeover occurs substantially more frequently. Hence, it generates considerable downtime, even with a well-functioning machine of the PRIOR ART. A known method of the PRIOR ART of reducing or eliminating this changeover downtime is to include a second crucible tilter that pours into the same pouring station 5 but from the other side of the track. Addition of a second crucible tilter needs to be planned in advance for a facility, it requires appropriate foundations and space, as well as having it easily integrated. In addition, the crucible tilters are costly. So, trade-off between an additional crucible tilter to decrease/remove changeover time may not be worth it since it is unlikely to double production. In many cases, investment is not regained through such capacity improvement.

With the present innovation, each crucible tilter is operated at its own pouring station 5. Installation of a new crucible tilter requires less planning and can be implemented more easily at a later stage. Addition of a new crucible tilter is associated with in a second pouring station 5. It essentially doubles the pouring capacity since the two pouring stations are used in parallel, being available for incoming empty moulds regardless of the state of the other. This provides additional options for locations of multiple crucible tilters. Their locations can be customized to suit the specific building conditions, e.g., side by side or in certain cases distant from each other.

It is further worth mentioning that with the machines of the PRIOR ART equipped with a track, if two crucible tilters are used to pour into a single pouring position, a common arrangement is to have one tilter positioned on the outside of the looped trolley track and the other one on the inside of the trolley track. Hence, each crucible changeover for the internal crucible tilter must have the crucible crossing over the top of the trolley track and equipment, with logistic and safety implications that must be addressed.

With the system of the present innovation, having individual pouring stations 5 for each crucible tilter allows the crucibles to be moved to the respective tilter from the same direction and thus eliminate the need of transferring crucibles over the top of sow casting moulds 3 and equipment.

Furthermore, with the system of the present innovation, moulds 3 are positioned by AGVs 1 during the whole process, so varying location in the moulds 3 where filling with liquid material occurs is possible, whereby varying where the initial flow of molten aluminium falls and thus avoiding premature wear of the moulds 3. This allows to spread out wear from unavoidable thermal shock over time to the entire mould bottom, allowing moulds 3 to be thinner, lighter, (potentially cheaper) while maintaining or extending lifespan of the moulds 3.

With the system of the present innovation, moulds 3 at the pouring station 5 are no longer part of a chain physically connected with each other, waiting in a non-modifiable queue to be filled. It provides flexibility of movement. Moulds 3 can be moved and raised to an ideal position for a crucible tilter or pouring spout. Hence, crucible tilters can be placed on the factory floor without expensive excavations in the foundation or mould chain support structures necessary to raise the whole machine. This flexibility of the present innovation again allows adding pouring stations 5 without the necessity to perform important work to the foundation.

It is worth noting that pouring into moulds 3 according to the present innovation is open to a large variety of pouring methods.

Moving moulds 3 with AGVs 1 allows, without being limited thereby, pouring from a tilted crucible, pouring from a suspended crucible, pouring from a furnace outlet, pouring from a launder, pouring from a tiltable spout, pouring from an intermediary pouring vessel, pouring from a mechanised or robotic ladle, and pressurising or syphoning from a holding vessel.

Figure 28A:
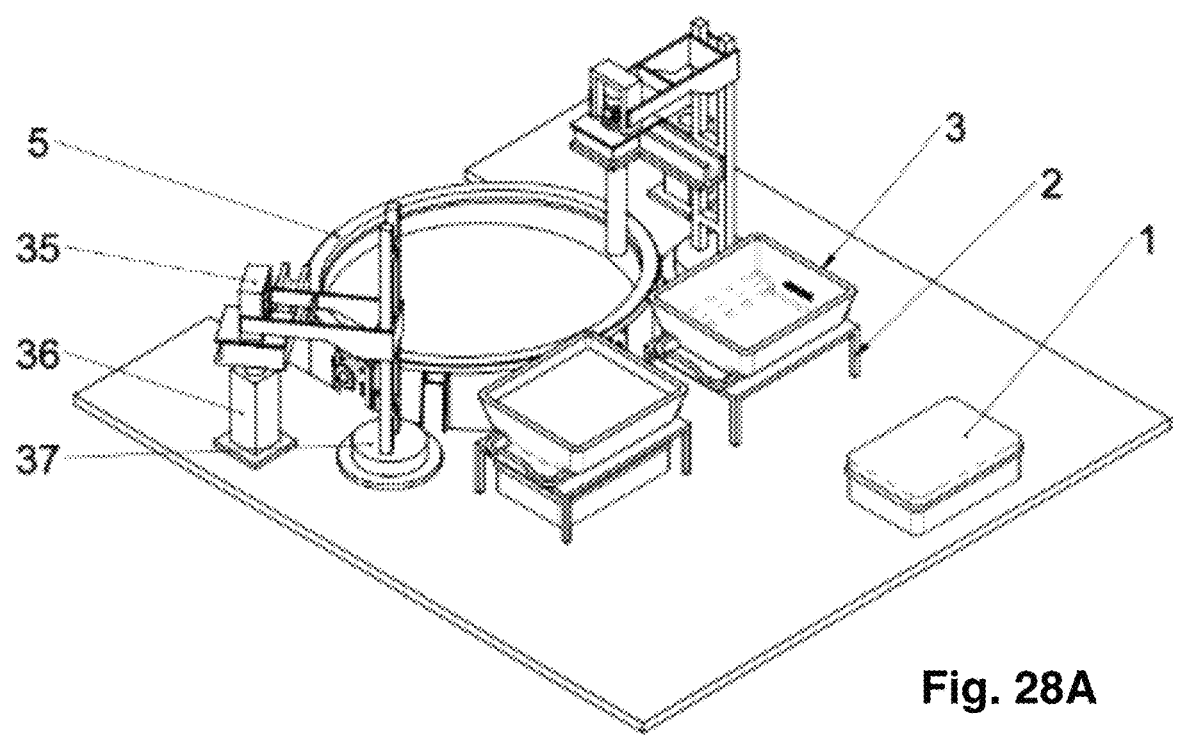
FIGS. 28A and 28B are isometric views of an alternative sub-system feeding a mould with liquid metal in accordance with an embodiment.
Figure 28B:
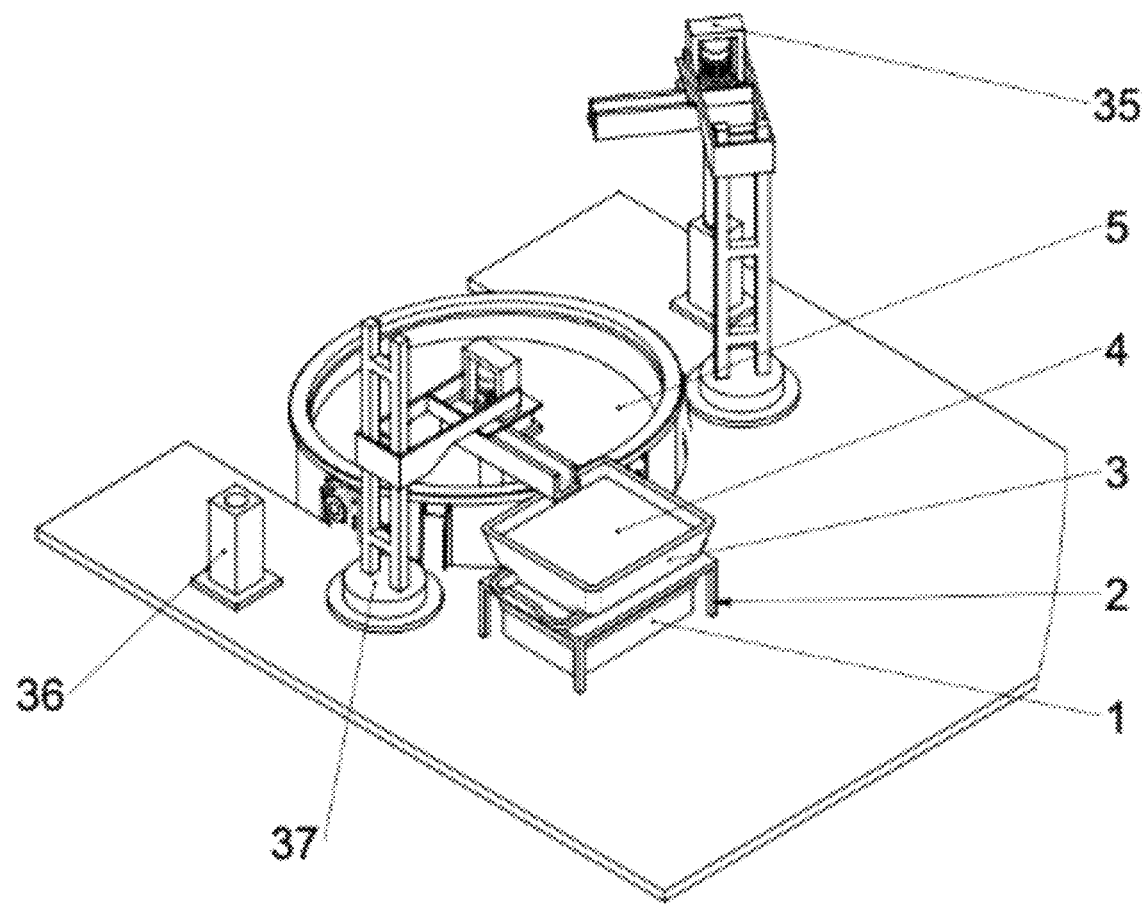
Figure 29:
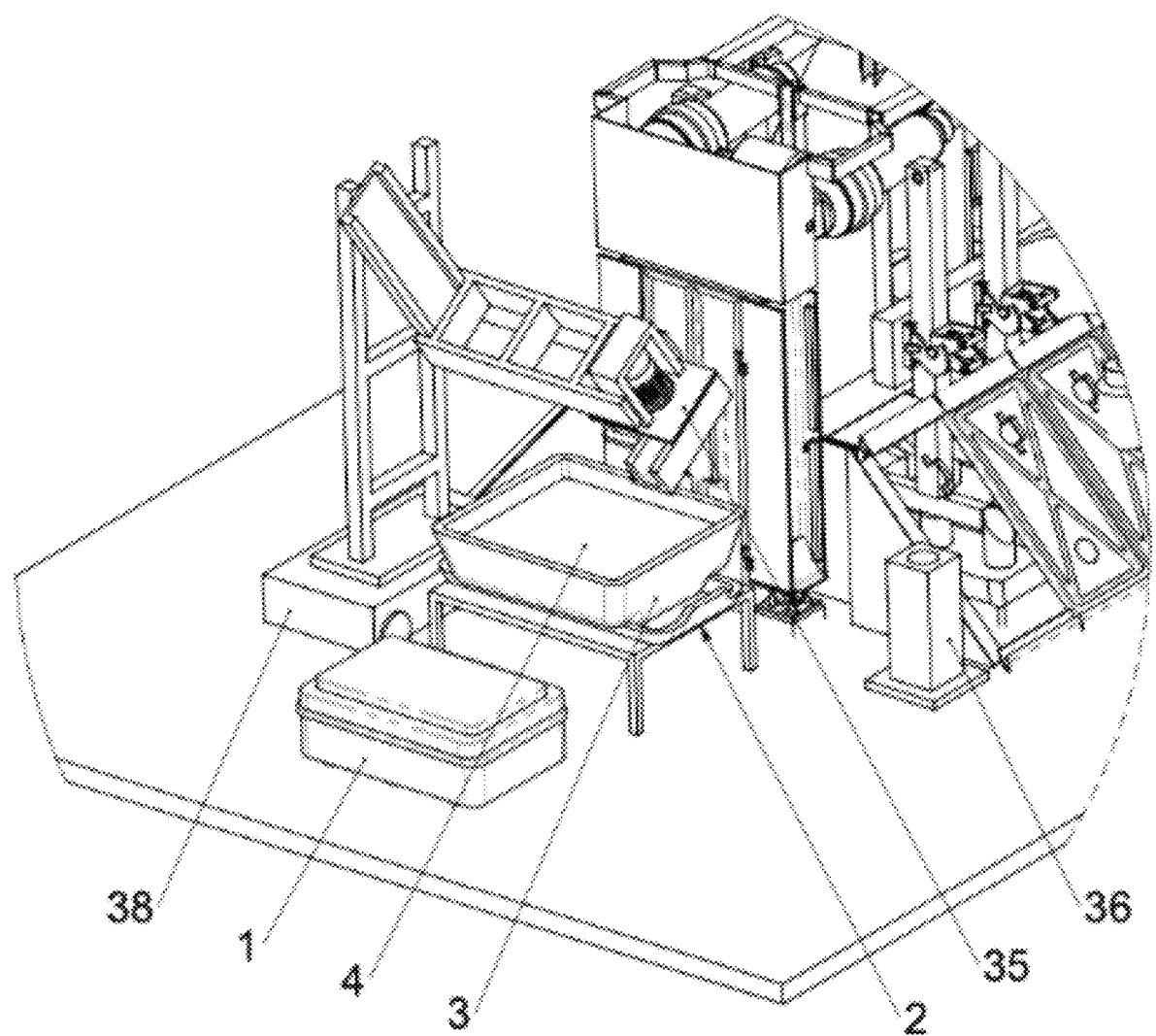
FIG. 29 is an isometric view of the sub-system of FIGS. 28A-28B with the mobile extraction device mounted to an AGV and the molten metal pump angled in accordance with an embodiment.

Referring additionally to FIGS. 28A, 28B and 29, alternatively crucibles can be set in a specific location and positioned using mechanical bump stops. Available embodiments comprise having a lifting and rotating structure 37, a molten metal pump 35 and a molten metal level sensor (not shown) that are then moved into place and lowered in such a way as the inlets of the molten metal pump 35 are submerged into the molten metal in the crucible.

Such embodiments also incorporate a preheater 36 of molten metal pump inlet tube, with the inlet tube being stored while not in use and preheated before use.

The molten metal pumps 35 are activated on demand to pump liquid metal into a multitude of sows.

Variation of pumping velocity is achieved by varying pump motor speed using a variable speed drive.

The emptying cycle is stopped when the prescribed amount of metal has been transferred into the corresponding number of sows.

The quantity of metal transferred is measured either by loadcell measuring the weight of added metal into a mould 3 or by a laser measuring metal height in the mould 3.

Therefore, one or the other of the described embodiments differ from the known prior art in at least one of the following characteristics:

Easily adding crucible tilters when needed;
Having for each crucible tilter a pouring station associated therewith. Hence, multiple pouring locations can be provided to one machine and operated simultaneously;
Individually raising moulds 3 into a pouring position;
Avoiding the need for expensive foundation work through moulds 3 being individually raisable;
Simplifying layout of the facility with crucible tilters (or other pouring methods) by avoiding the presence of tracks passing through underneath the pouring point;
Allowing variations in placement of moulds 3 during pouring, spreading thermal shock resulting from the pouring over a larger area by varying location of moulds with AGVs;
Pumping metal, thereby providing safer environment than when lifting crucibles;
Being able to simultaneously fill many moulds from the same crucible, thus being able to accelerate pouring without adding a second expensive crucible station;
Decreasing complexity, and thus cost compared with use of a crucible tilter;
Reducing the risk of unplanned shutdowns due to failures with a multitude of molten metal pumps;
Increasing speed in emptying crucibles.

Skimming Station

Figure 6:
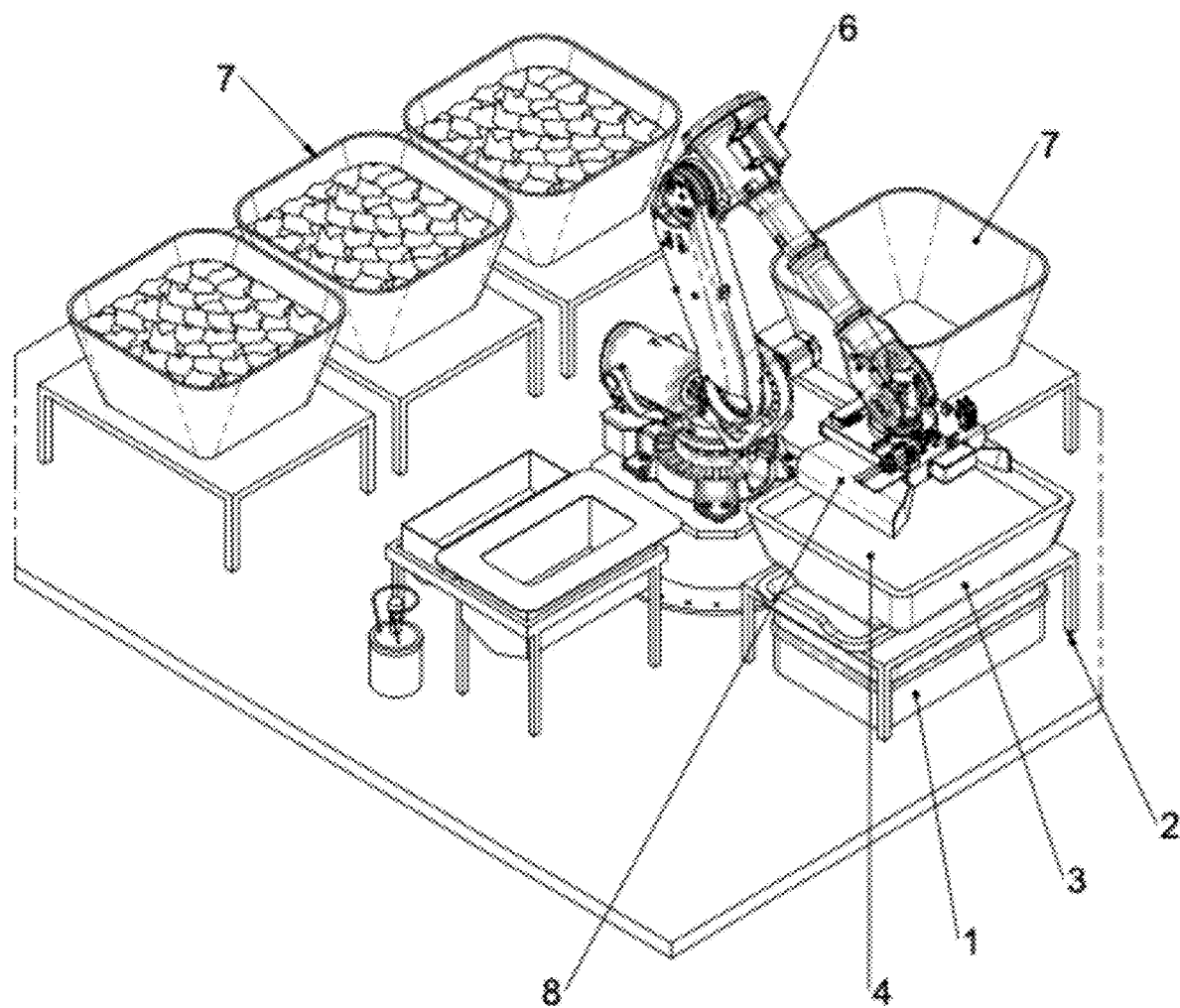
FIG. 6 is a depiction of components involved in the operation of skimming.
Figure 7:
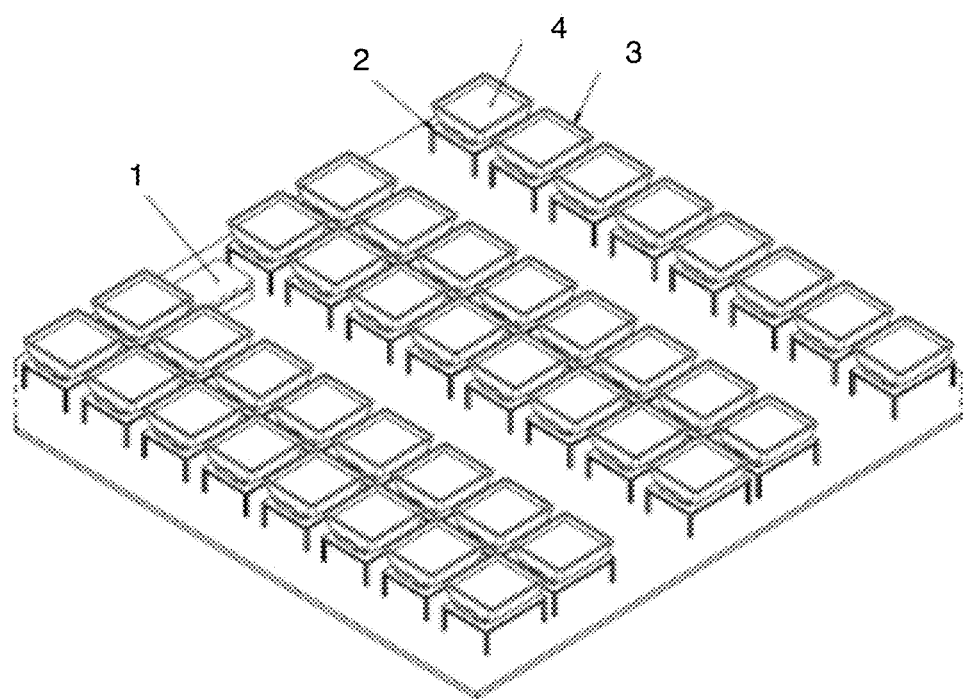
FIG. 7 is a depiction of a layout of a cooling station in accordance with an embodiment.
Figure 8A:
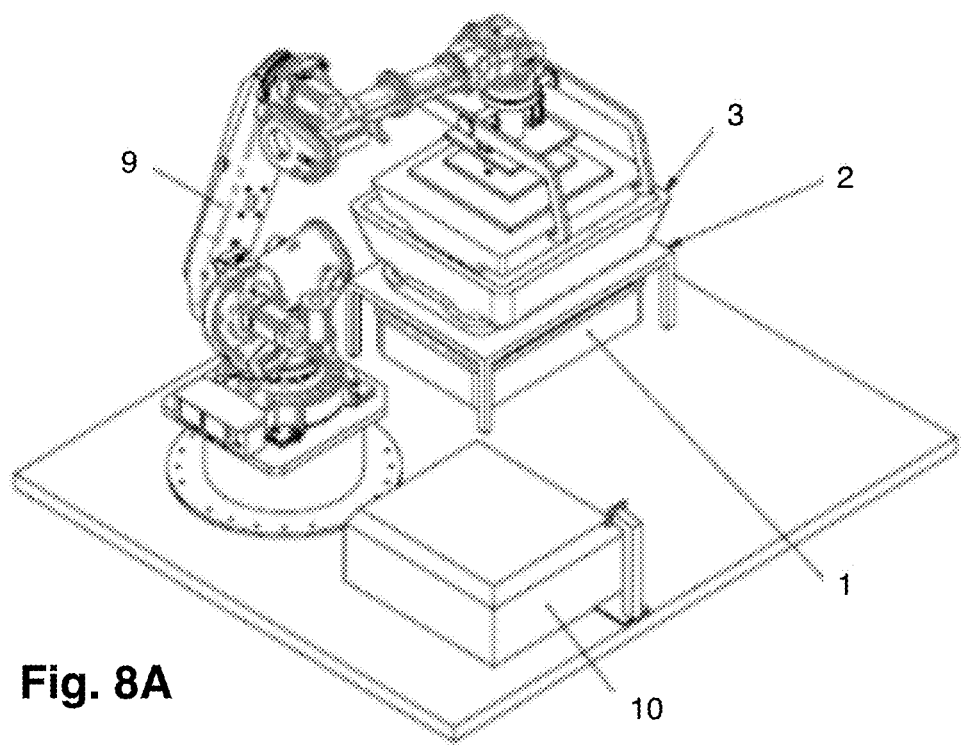
Figure 8B:
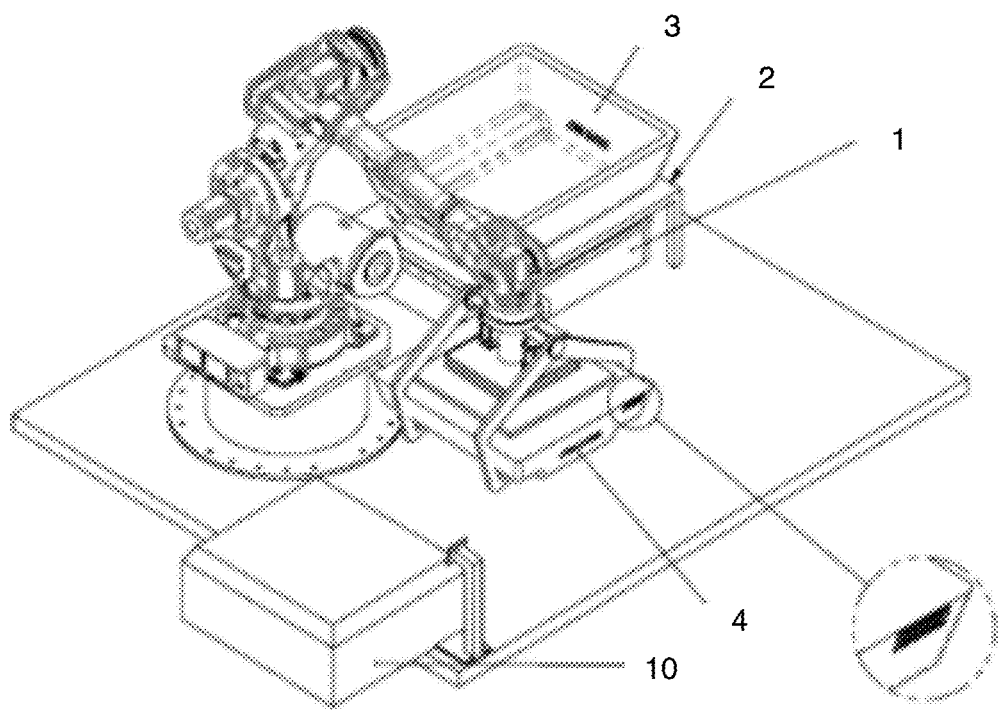

Referring to FIGS. 1A-B and FIG. 6, components involved in the operations of pouring and skimming are depicted.

After the prescribed amount of liquid metal is poured into a mould 3, these liquid sows are generally skimmed. Skimming involves scraping a skimming tool 8 across the top surface of the liquid metal, thus removing solid material that is floating on top of the liquid pool of metal. This top surface of metal is then taken away and dropped into a nearby bin where the dross can be processed, and residual aluminium can be reclaimed.

This process removes aluminium dross or other floating inclusions to provide a smooth surface on the top of the sow, which is the open surface of the mould. Resulting therefrom, proportion of usable metal is improved, and the top surface is smoother, which benefits the appearance for marketing purposes and functionality when a vacuum lifter is used to demould, since a smoother, flatter surface improves obtention of a vacuum seal.

Skimming is performed either manually by an operator with an appropriate skimming tool, with an overhead mechanism such as tooling suspended from a gantry crane, or by a robot with a skimming tool connected to its wrist. The action is normally performed with a single paddle that passes across the top surface, pushing the dross to one side and then the tool is angled so that it picks up this dross. Alternatively, it can be performed with opposing tools that come together like jaws, picking up the dross when the two opposite tools meet as depicted in FIG. 6. Metal is removed in either a single pass or over multiple passes to ensure that more coverage of the top surface of the sow 4 is skimmed and that more dross is removed. It is beneficial for the skimmer to avoid extending too far below the surface to avoid disturbing the liquid metal or removing a volume of material that is unnecessarily large.

Skimming needs to be performed when the top surface is still liquid, so it is commonly performed with PRIOR ART machines in the position immediately after pouring. If skimming is not performed at that time, the top surface is rougher and less likely to be successfully demoulded. The sow can also be rejected, deemed unacceptable to be sold.

With sow casting machines of the PRIOR ART, trolleys are interlinked through the trolley chain, with the effect of a problem anywhere in the machine preventing the chain from indexing and thereby risking that the top surface of the sow 4 solidifies before being skimmed.

The system of the present innovation features advantages relative to the skimming. Moulds 3 are supported on their frames and are transported by AGVs 1. Moulds 3 that have just been poured are transported by an AGV 1 directly from the pouring station 5 to a skimming station 6.

With skimming stations of machines of the PRIOR ART, a skimming robot is placed to the side of the moulds and can only skim one sow at a time from one position along the track.

The system of the present innovation allows skimming anywhere within the envelope of the reach of the skimming robot, so multiple skimming locations, aka positions, may be set around one skimming robot. It does not need to be at a location with a movable track underneath, so greater flexibility with the design is available, especially with drip trays that capture dripping aluminium from the skimming tool. Moulds 3 can arrive and leave following the same path. Moulds 3 can arrive from any direction; hence the same skimming robot can skim more sows within the same period, making better use of existing equipment.

The location of the skimming robot and of the skimming station(s) 6 can be flexible. For functionality purposes, they are preferably set near the pouring stations 5, but do not need to be located on a set path. Dross bins 7 receiving the dross require regular changeover, potentially when the skimming robot is idle but other processes may take place independently. Emptying dross bins 7 is commonly performed by an operator on a forklift and hence requires interaction with operators and equipment outside of a safety fence. This flexibility in the location(s) allows for more optimal positions to be found for the skimming stations 6, such as locations providing an easy forklift access.

Flexibility of position of the skimming robot yields the advantage that the system does not need to be right next to the crucible tilters or pouring spouts, where operating space is restricted. This reduces risks of collision with nearby equipment and allows simpler designs. It also reduces heat skimming robots and/or skimming devices are subjected to, as allowing to flexibly limit number of sows holding hot metal nearby to the one skimmed, and other waiting to be skimmed or already skimmed. With the time they remain idle being minimized.

Having multiple skimming positions associated with a single robot results in movements of sows no longer affecting the skimming process. The skimmer robot can transition directly from skimming one mould to skimming the next one without waiting for the indexing of e.g., the trolleys of a trolley-based system of the PRIOR ART. This allows to finely modulate the process. For instance, it allows slower skimming or additional passes without decreasing the production rate of the entire system of the present innovation.

As each mould is moved independently, skimming can occur as long as the skimmer is operational and there is a spare position. Hence, poured moulds 3 can progress to the skimmer and be skimmed regardless of any interruptions downstream at other locations throughout the process. Risks of sows 4 not being skimmed within an acceptable delay are thereby reduced.

The skimming function is not commonly the critical path in production with machines of the PRIOR ART. If it is found to be holding up production, usually a second skimming robot is added and implemented into the system.

With the system of the present innovation, a second skimmer could be utilised for redundancy.

The system and method of the present innovation that move filled sows up to the skimming station by AGVs 1 is versatile and can be utilised for various skimming methods such as robot skimming, gantry skimming, and mobile robot skimming. It is also appropriate with manual skimming with the correct safety procedures put in place to ensure that operators remain in a safe protected place. The skimming tool 8 used may vary and may be adapted for single paddle/blade methods, double blade methods, or manual tooling.

Therefore, the described embodiment differs from the machines of the PRIOR ART in at least one of the following characteristics:

Having AGVs 1 driving newly poured sows 4 to the skimming station 6;
  Skimming multiple sows 4 with a single skimming robot, provided they are located within the operating envelope of the skimming robot;
  Skimming can be performed from one mould to the next without having to index a trolley, thus without associated waiting time;
  Allowing the skimmer to be located distant to the crucible tilter;
  Being robust since issues anywhere in the system do not interrupt the skimming process of sows 4, reducing risk of unskimmed, rejected sows;
  Allowing to easily increase the number of skimmers to increase capacity or to add redundancy; and
  Allowing to use a number of skimming methods, e.g., fixed robot-style, mobile-robot-style, gantry-style, single blade, and double-blade.

Cooling Station

Referring now to FIG. 20, an exemplary layout of a cooling station 32 is depicted.

After the skimming operation, liquid metal is left to cool until it has solidified throughout and is able to be removed from the mould 3.

Previously, with machines of the PRIOR ART, cooling is sometimes performed with the assistance of water to draw away heat. Such machines are less common since having issues with safety and corrosion. With modern automated machinery of the PRIOR ART, cooling is more commonly performed from a combination of forced air cooling, natural convection and radiation. A common demoulding method is vacuum lifting during which sows 4 are lifted out of the moulds 3. Therefore, sufficient time is required between pouring and demoulding to ensure that sows 4 are cool enough to structurally support themselves when lifted.

The air-cooled automated machines of the PRIOR ART using tracks reach the necessary cooling time by extending the track. Longer tracks provide more positions between the pouring station and the demoulding station; allows for a longer cooling time. A larger capacity machine requires a quicker cycle time. In order to achieve the same overall cooling time, more positions are required prior to demoulding. As sows 4 are cooling, sows 4 are consistently indexed to their next position. At various locations, fans or blowers may be installed to improve the cooling rate.

The system of the present innovation features a dedicated cooling station 32 that looks like a parking lot for the sow moulds 3 and their supports. AGVs 1 take skimmed sows from the skimming station and transport them to a free position in the cooling station 32. AGVs, afterwards, are free to leave sows 4 to cool down and to go off performing other tasks. After a prescribed time, when sows 4 are suitably solidified and cooled, an AGV picks them up and drives them from the cooling station 32 to the demoulding station.

The cooling station 32 can be optimised for cooling, setting the necessary air flow to improve cooling and solidification. The cooling process can thus occur within a more condensed area rather than being spread out linearly along a track such as with machines of the PRIOR ART, so the whole area is able to be easily managed specifically for cooling. It also allows to minimise the required floor space.

Machines of the PRIOR ART have moulds mounted linearly on a trolley track. The moulds have large radii corners so they can suitably index around the track. This results in large floor space with often wasted space in the middle of the track loop which is only accessible via a crossover.

The condensed cooling station 32 of the system of the present innovation greatly reduces the area required for that operation, resulting in either a more compact system or an improved capacity system.

Many options are available to suit production capacity or specific layouts. As there is no trolley chain, any large array of arrangements of cooling stations 32 are possible, considering they provided the necessary AGV access. Whilst square or rectangular shapes for cooling stations 32 are a good use of space, L-shapes or split cooling stations 32 are also available and easily customisable to suit particular factory layouts. Other factors, such as cooling components, e.g., fans may influence the selection of a layout over another.

The purpose of the cooling station 32 is to solidify the material through the reduction of the temperature of sows 4.

With machines of the PRIOR ART, indexing of moulds generates unnecessary movements, which can create waves on the top surface of the sows.

The system of the present innovation allows sows 4 to remain stationary throughout most of the cooling period; sows containing liquid aluminium are moved only when moved into the cooling station 32. Hence, improvement in the quality of the top surface of the sows 4 results therefrom.

Improvement in decreasing wear of moving and indexing components also results therefrom.

The trolley chain of machines of the PRIOR ART are indexed at every cycle. They are, hence, a high wear item. The track itself is also susceptible to wear and requires constant tensioning and adjustment to ensure that the trolley chain remains tight and able to safely index moulds smoothly without derailment.

The system of the present innovation removes risks of uneven movement and of derailment. It further eliminates maintenance associated with indexing components and the tracks, and thus associated upfront costs.

Rapid changes of mould temperature also contribute to wear and deformation of moulds. These changes of mould temperature are the main cause for mould failure.

Individual driving of moulds 3 allows the system of the present innovation to make better use of sets of moulds 3 by allowing to select which, and the number of moulds 3 when the production rate does not require using all available moulds 3. It allows to control delays between demoulding and pouring into the same mould, only using the necessary number of moulds 3. Hence, the system of the present innovation increases mould lifespan. It further allows to decrease the preheat period and thus the required associated energy. In consequence, it allows to vary the number of moulds 3 in production to suit the production rate for a particular cast.

The cooling operation is often lengthy and little intervention is required during this operation. Therefore, the cooling station 32 can be located distant to the skimming station 6. Sows 4 can be smoothly transported to other parts of the facility where cooling may be more productive, or where space is available.

An available option is to utilise water to increase heat dissipation, hence reducing cycle time and increasing cooling capacity. As sows 4 can be transported to cooling stations 32, it does not need to be located near the pouring station 5, avoiding risk of water spraying and touching the pouring station 5 and thereby limiting associated issues.

It further allows, according to embodiments, to modulate cooling process between air-cooling and water-cooling while decreasing risks of water being in contact with liquid metal.

Therefore, the described embodiment differs from the machines of the PRIOR ART in at least one of the following characteristics:

- Having sows 4 remaining stationary throughout a major part of the cooling operation, reducing unnecessary movements and improving sow quality;
- Driving sows 4 to a cooling station 32 immediately after the skimming operation and left there until they are suitable for demoulding;
- Using more efficiently available floor space and thereby having no wasted space resulting from e.g., the inside of a track;
- Easily customizing configuration to suit specific factory layouts;
- Easily increasing capacity by increasing cooling station allotment;
- Decreasing costs since supply and maintenance of indexing, trolley chain, track, tensioning, and hydraulics and tensioning are eliminated;
- Eliminating risks of derailment;
- Controlling the number of moulds 3 used on a given pour thereby reducing temperature variation on moulds 3; and
- Setting cooling station(s) 32 in one or a variety of locations within the facility, potentially distant to the pouring station and/or the skimming station.

Demoulding Station

Referring to FIGS. 1A-B and FIGS. 8A-B, there is depicted the general layout a demoulding station according to an embodiment.

Removing large aluminium sows 4 from their moulds 3 can be a difficult process, based on their substantial size and mass. Inverting the moulds 3 is logistically difficult and fraught with risks. With manual casting, sows can be removed by adding aluminium handles or other lifting devices after pouring. Alternatively, steel wedges can be inserted in the top face before solidification and removed after solidification to provide pockets in the upper surface for a device to latch into and lift from. Modifying the top surface, however, can affect stacking ability, can be undesirable to customers, can create locations for moisture to rest, create safety hazards, and are difficult and costly to automate.

Automated machines of the PRIOR ART typically use vacuum lifters to perform the initial removal of sows from moulds. The trolley chain is indexed on the track so that the sows are suitably cooled at the demoulding station, ready for removal. A vacuum head suspended from a lifting device is then lowered onto the top surface with vacuum applied. The device is then raised, taking the sow with it while leaving the mould and trolley in place.

Sows are taken to the processing station where it is weighed, marked, and stacked. Once sows and demoulding equipment are clear of the mould and trolley chain, the trolley chain is able to be indexed so a new solidified sow is present at the demoulding station again.

Recent improvements and trends involve performing this demoulding function with the vacuum head attached to a large-payload robot.

Demoulding process of the system of the present innovation behaves in a similar manner to the automated description above, except that sows 4 are moved to the demoulding station 9 by AGVs 1. Using a demoulding robot to demould, it is possible to have multiple demoulding positions, provided they are within the operating envelope of the demoulding robot. Hence, the indexing or travel time into and out of the area can be omitted and capacity increased. This also means that if there are issues with demoulding, it can be reattempted without impacting the upstream operations.

With the system of the present innovation, as there is no trolley chain passing underneath, resulting in a design of the demoulding station being simpler and more modular. It can be designed specifically for the demoulding function.

It further allows to easily increase duration of the cooling process, potentially decreasing the temperature of the sows, and wear of the suction cup since premature wear of the suction cup increases with temperature of the sows, and that without decreasing general productivity.

If higher capacity or redundancy is required, then multiple demoulding units can be included or added with low or no impact on the remainder of the system.

As there is no continuous chain passing near the demoulding station 9 and the only hot sows 4 close by are the sows 4 waiting to be demoulded, there is less radiant heat impacting upon the equipment.

An embodiment which uses suction for initial lifting of the sows 4, with physical protrusions being placed between the sows 4 and the moulds 3 when the sows 4 are lifted above the moulds 3, allows to minimize time of contact between the suction cup and the sows 4. Afterwards, sows 4 are moved using physical components, e.g., automated forks, rather than pneumatic component, e.g., suction cup.

Therefore, the described embodiment differs from the machines of the PRIOR ART in at least one of the following characteristics:

- Moving cooled sows 4 to demoulding stations 9 with AGVs 1;
- Having flexibility over demoulding methods, such as vacuum and robot demoulding systems;
- Having multiple demoulding positions available within a demoulding operating envelope of a system component, e.g., a robot, thereby improving cycle time by not needing to wait for indexing;
- Having a simpler design since not having any trolley chains passing underneath;
- Easily increasing the number of demoulders if required for redundancy or capacity improvements; and
- Reducing radiant heat on demoulding equipment.

Stacking, Weighing, Marking Station

Figure 9:
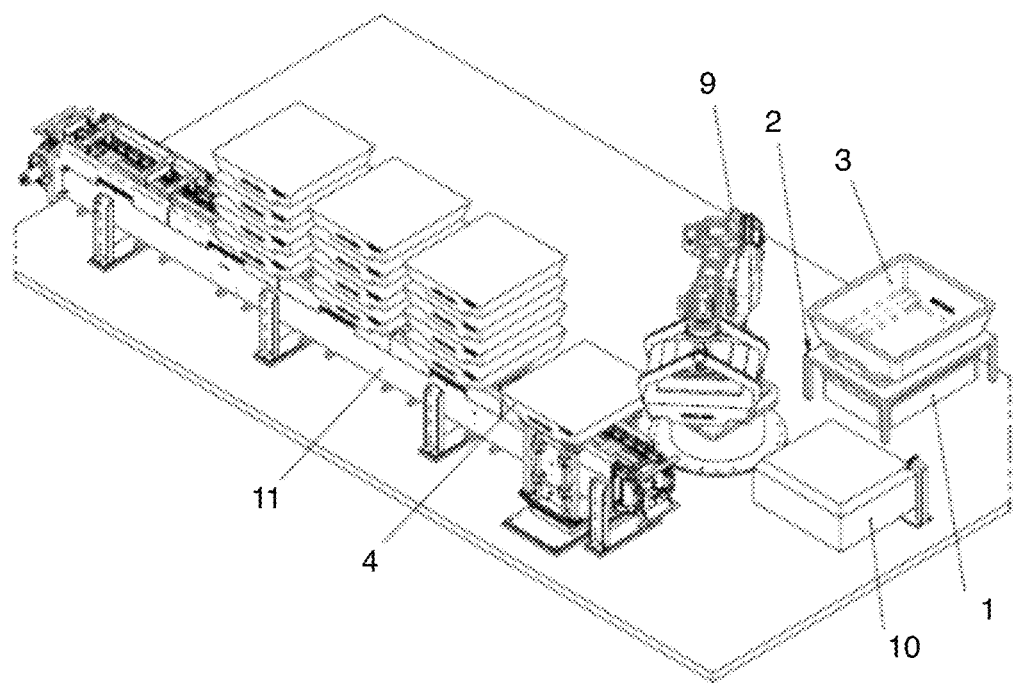
FIG. 9 is a depiction of an exemplary general layout of an area where stacking, weighing and marking operations are performed.

Referring to FIGS. 1A-B and FIG. 9 depicting an exemplary general layout of an area wherein stacking, weighing and marking operations are performed.

Once sows 4 are removed from moulds 3, they are processed. This involves weighing them, marking them, determining if they are acceptable or a reject, and stacking them for easier transportation at a weighing and marking station 10 on e.g., a conveyor 11. These operate on sows 4 after they are removed from the moulds 3 are not strongly impacted by the system of the present innovation. It processes them in the same manner as with machines of the PRIOR ART.

Preheating Station

Figure 10:
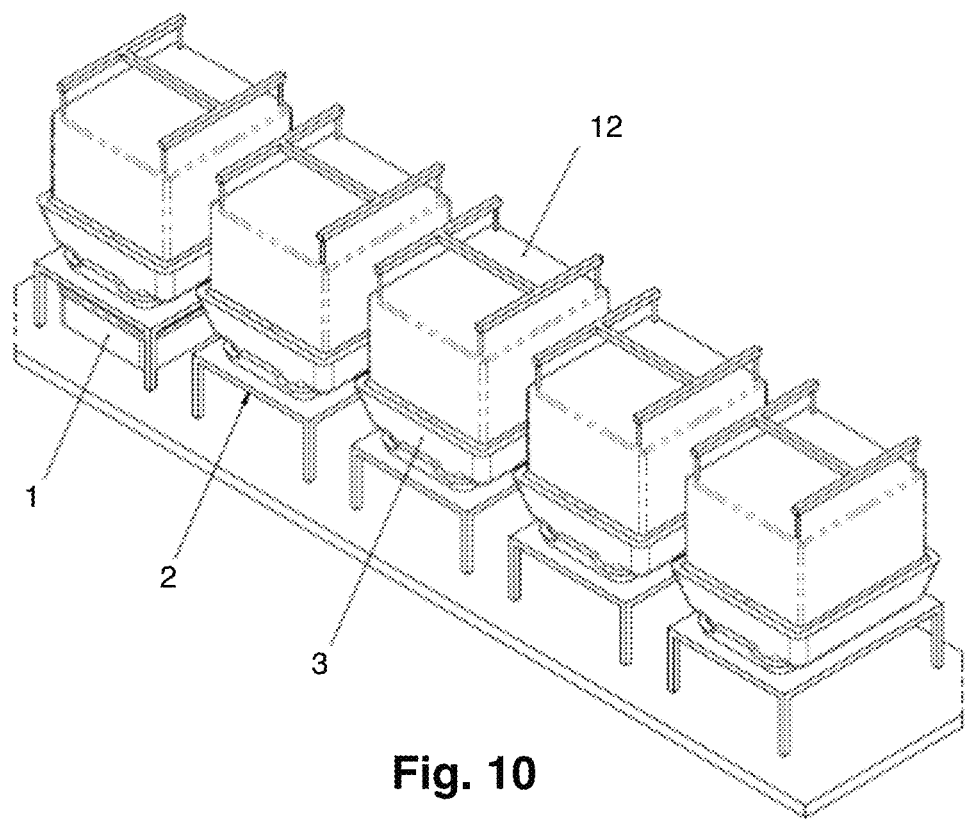
FIG. 10 is a depiction of an exemplary general layout of a preheating station.

Referring now to FIGS. 1A-B and FIG. 10 through which is depicted an exemplary general layout of a preheating station 12.

When any surface comes into contact with liquid aluminium, it is common practice to preheat the surface to remove moisture therefrom and to minimise the thermal shock. When water comes into contact with liquid aluminium, it instantly turns into steam, expanding in size and throwing liquid aluminium in various directions. This is hazardous for both operators and equipment and thus must be avoided. Water can be sprayed onto aluminium and large pools of water used to instantly quench aluminium safely, but issues occur when water is entrapped by liquid aluminium. Such a situation can occur when liquid aluminium is poured on top of a mould that is wet and not properly preheated. Hence, moulds 3 must be preheated prior to their use.

Moulds of machines of the PRIOR ART are generally preheated by gas burners or electric infrared heaters. They are positioned over the top of the moulds so that they heat the inner surfaces on which liquid metal is poured. It is generally desired to raise the temperature of the moulds to over 100° C., as water becomes steam at this temperature. For safety purposes, the upmost important factor is to eliminate any moisture on the inside surface of moulds. Furthermore, the higher the overall temperature of moulds, the minimal the thermal shock effect undergone by moulds when pouring into, so higher temperatures can be advantageous. However, moulds are large and require a lot of energy to raise their temperature.

Automated machines of the PRIOR ART have a trolley chain and track underneath the moulds, so the heating occurs purely above the moulds. The heaters are arranged at several positions leading up to the pouring so that the moulds can be heated up and then poured without significantly cooling down in between these stations. A mould would be positioned underneath the first heater and then indexed to the next heater until it reaches the final heater and is ready for pouring. Some casters require multiple passes around the track circuit before the moulds reaching a suitable temperature, whilst some are ready for pouring into after one pass underneath the heaters. Heaters are located to maximise the heat transfer into the moulds when stationary and commonly do not account for maximised heating during indexing. After moulds having been poured into and sows have been removed, with no significant machine downtime having occurred, moulds are often significantly hotter than the prescribed preheat temperatures. So, heaters can be turned off or changed to a low energy "standby" phase. The number of heaters is dependent upon the size of the moulds, the strength of the individual heaters, and the capacity of the machine as a whole. Larger capacity machines index more frequently, resulting in more heaters required for the moulds to be heated for the designated period.

The system of the present innovation also requires moulds 3 to be preheated prior to pouring. Heating moulds is performed by, but not limited to, gas burners or electric radiant heaters. Moulds 3 are moved to preheating stations 12 forming closable compartments. At the start of a cast, when moulds 3 are cold, AGVs 1 move cold moulds 3 that are to be preheated on their support structures to preheating stations 12. Multiple preheating stations 12 are present so that the preheaters can keep up with the production rate of the entire system, even at start-up state of the system.

Moulds 3 moved by AGVs 1 allows the moulds 3 to enter and exit preheating stations 12 using the same path or direction. It allows insulation to be utilised on the remaining sides of the moulds 3 to trap and reflect heat, improving the heating process; the process is more efficient, resembling to placing moulds 3 into ovens and removing moulds 3 therefrom. On the open side of the preheating stations 12, insulating doors can be utilised to further optimise heat and energy saving.

It is worth mentioning that this is impossible to achieve with machines of the PRIOR ART since the moulds are continually indexed from one direction and out the other on a track.

With the system of the present innovation, a controller monitors which preheating stations 12 are empty and which already have a mould 3 therein. AGVs 1 can move moulds 3 only to empty preheating stations 12. Moulds 3 can then remain in the preheating stations 12 for the duration of its heating cycle without being moved e.g., from one preheating station to the next. This provides moulds 3 with maximum preheat efficiency throughout its entire heating cycle.

Once an AGV 1 drops off a cold mould at a designated preheating station 12, the AGV 1 leaves the preheating station 12 to perform other tasks. This avoids the AGV 1 to undergoing the heating phase with the mould 3; decreasing risks of damaging equipment.

With machines of the PRIOR ART, there are risks of heating up the trolleys and track underneath the heaters, especially if there is a stoppage in the trolley track when the moulds are not properly in position underneath their designated heaters.

The ability to vary the capacity of the system using AGVs 1 of the system of the present innovation allows for only a subset of moulds 3 available to be used. This reduces wear on the moulds 3 while also reducing the number of moulds 3 requiring preheating during start-up. Hence, with the number of moulds 3 reduced, and the efficiency of the preheating process increased, the required energy associated therewith is substantially decreased.

Once the preheating phase is completed and moulds 3 are up to the set temperature, heaters of preheating stations 12 can be turned off or set to a low-energy state.

The modular nature of the preheating stations 12, where each heater has an individual designated preheating station 12, allows for easily increasing or modifying capacity by merely adding more preheating stations 12.

Therefore, the described embodiment differs from the machines of the PRIOR ART in at least one of the following characteristics:

Moving moulds 3 in and out from one direction allowing for a more efficient preheating design involving insulating walls;

Having moulds 3 remaining in place during preheating, thereby increasing efficiency;

Having AGVs 1 leaving moulds 3 in the preheating stations 12 to perform other duties, reducing risks of damage due to overheating of surrounding equipment;

Having the heating capacity easily expandable through addition of additional modular preheating stations; and Having the time dedicated to the preheat modulable rather than set by indexing.

Metal Treatment Equipment

Figure 11:
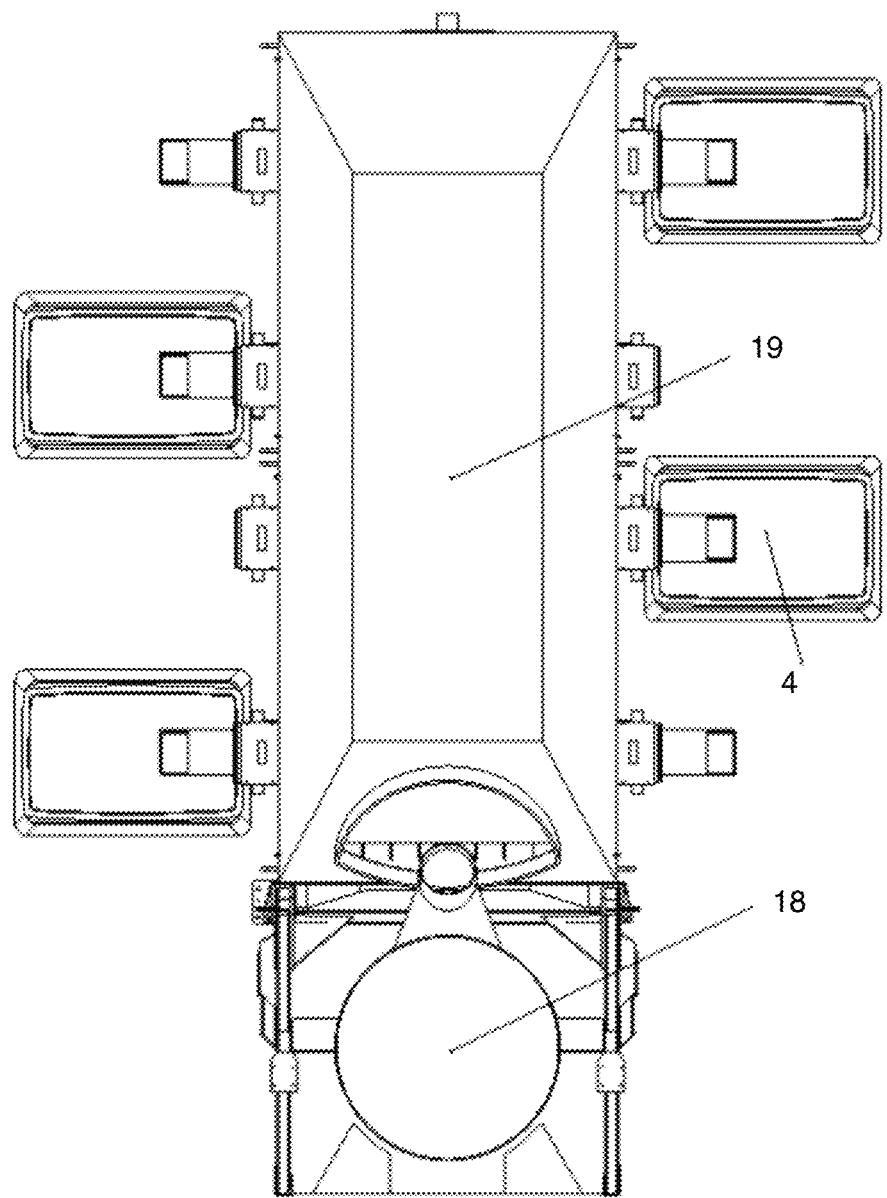
FIG. 11 is a plan view of a multi-pouring metal treatment station in accordance with an embodiment.
Figure 12:
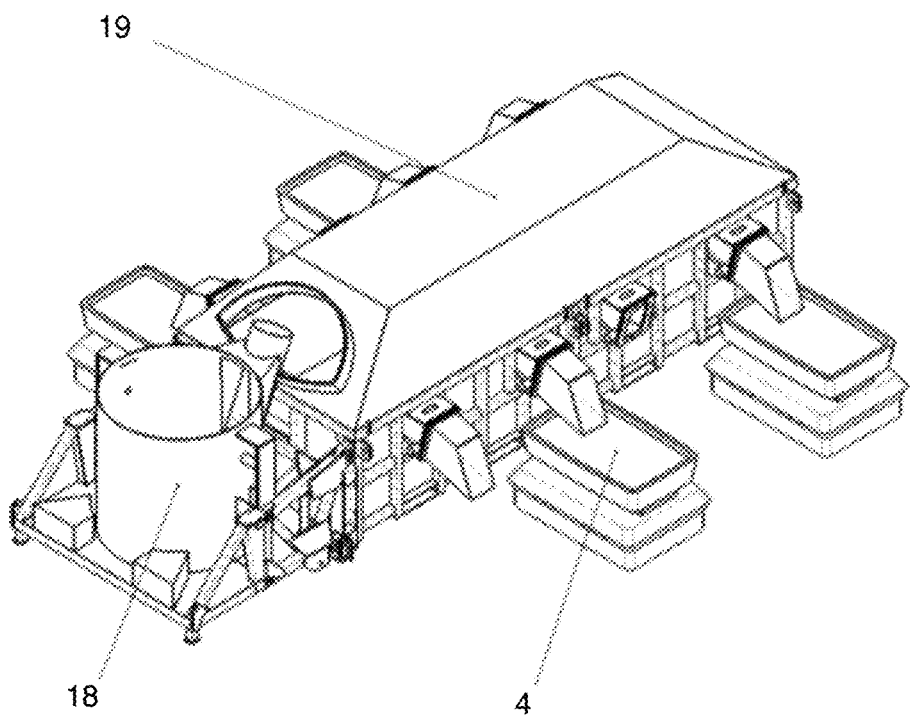
FIG. 12 is an isometric view of an exemplary multi-pouring metal treatment station in accordance with an embodiment.
Figure 13:
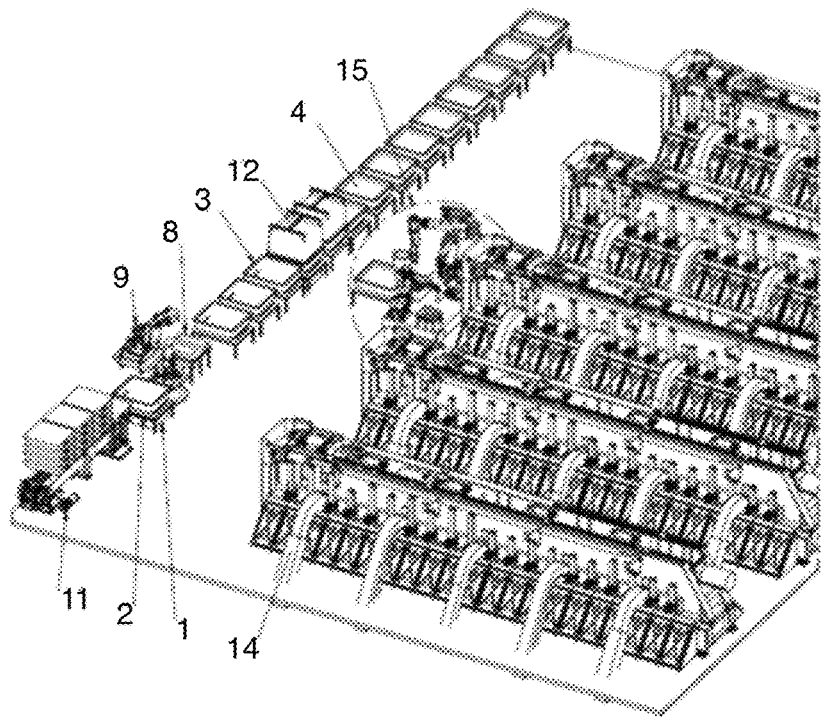
FIG. 13 is a depiction of an exemplary reduction cell to mould in accordance with a first concept variation.
Figure 14:
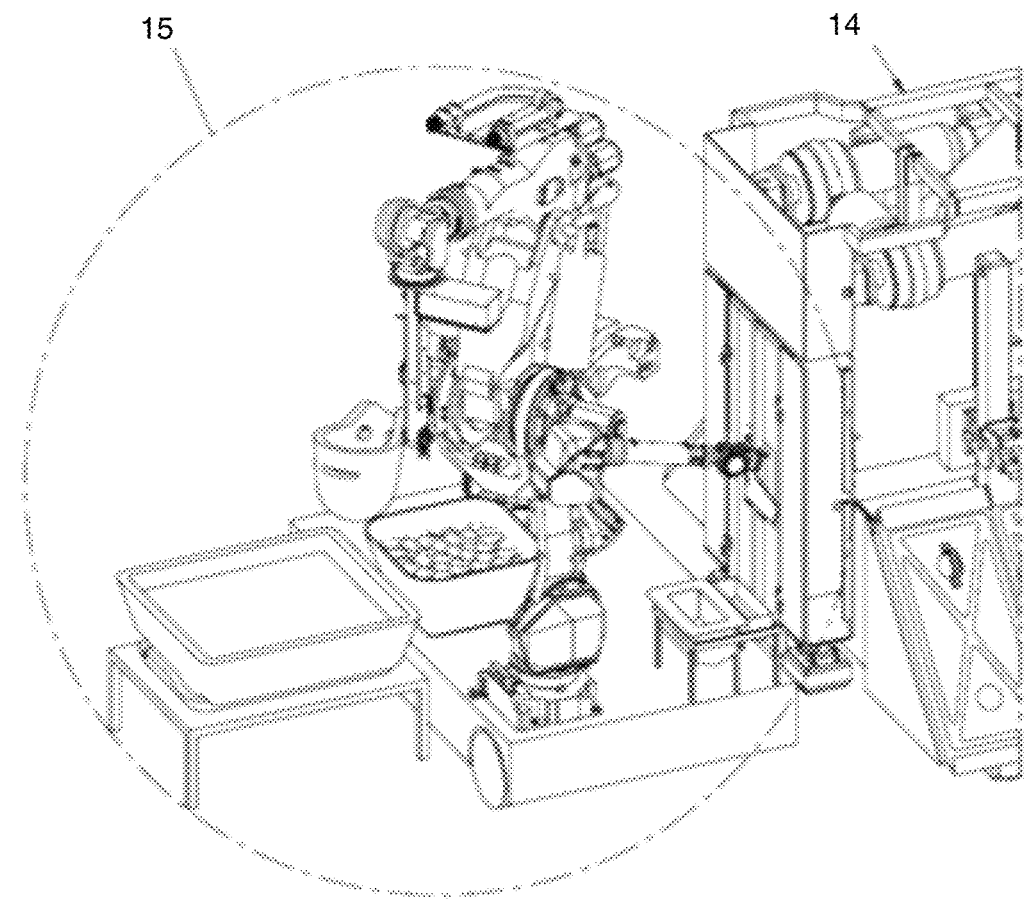
FIG. 14 is a depiction of a mobile extraction device comprising a robot in accordance with the first concept variation.
Figure 15:
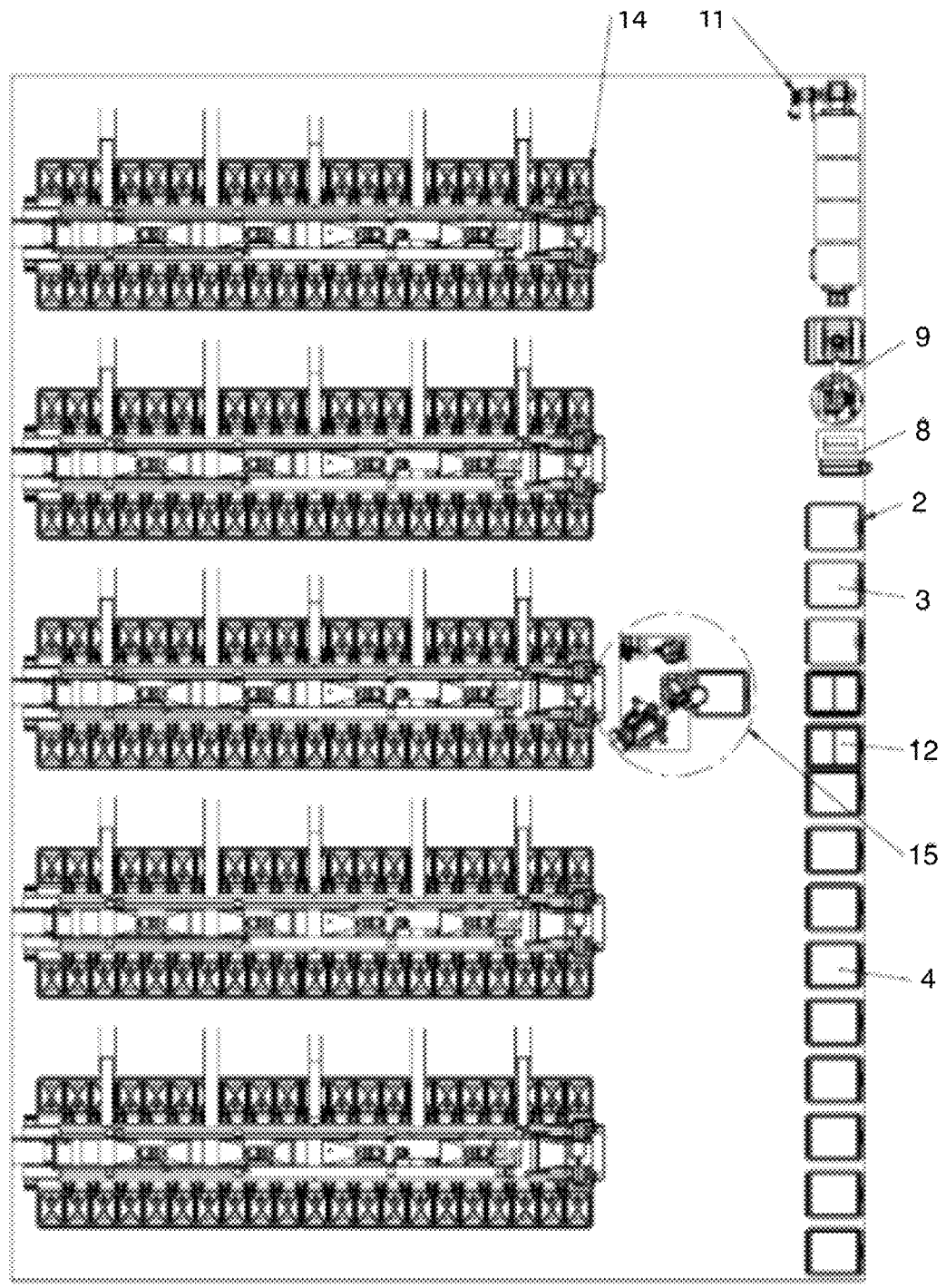
FIG. 15 is a plan view of a pot room-based sow casting machine in accordance with the first concept variation.
Figure 16:
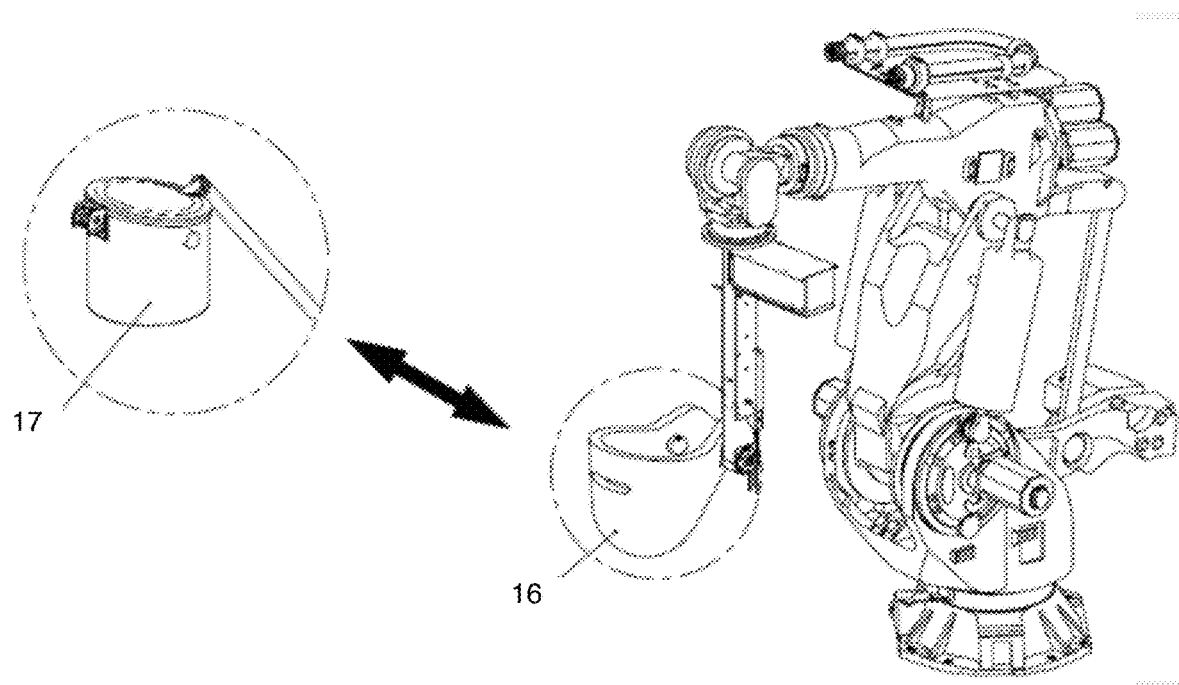
FIG. 16 is a depiction of a mobile extraction device comprising a robot with tools mounted thereto in accordance with the first concept variation.

Referring now to FIG. 11 and FIG. 12 wherein are depicted a device designed to hold, mix, and maintain adequate temperature of a large quantity of metal; and an exemplary multi-pouring metal treatment station.

In some cases, aluminium producers want to control or enhance the purity or add specific elements to the metal before casting in order to produce alloys or higher-grade aluminium for more specific applications. This increases the value of the metal produced and creates higher revenue for producers.

This can be done in many ways but often requires mixing large quantities of liquid metal together to obtain a homogenous batch that can then have the relevant treatments like degassing, filtering, and skimming. This ensures that the composition is consistent from one sow to the next. Specific elements can then be added to this batch in controlled quantities to create alloys.

In order to make this process compatible with the sow casting system of the present innovation, an additional device may be included to hold, mix, and maintain adequate temperature of a large quantity of metal (FIG. 11). This acts as a holding receptacle 19 for the metal treatment, similar to a holding furnace, but specifically designed with the AGVs 1 as a focus. Consequently, single or multiple pouring positions can be used. This intermediate receptacle 19, filled with a crucible 18, interfaces directly with the AGVs 1 and fills the sow moulds 3. At the end of the pour, when the sow 4 is at its prescribed height, the flow can be ceased. This allows for individual or multiple moulds 3 to be poured into at any one time, allowing for high capacity pouring from a single device.

Therefore, the described embodiment differs from the machines of the PRIOR ART in at least one of the following characteristics:

Being compatible with use of AGVs;

Allowing to degas and filter molten metal before casting;

Replacing the need for pouring directly from a crucible tilting table;

Mixing a large volume to make homogenous sows;

Producing alloys thereby adding value to sows produced; and

Having multiple sows poured from the one receptacle.

Pouring into Moulds Directly from Pots

Conventionally in the PRIOR ART, aluminium is produced in a reduction cell 14 or "pot" via the electrolytic reduction process. An electrolytic bath fills the entire pot where an electric current passes from the anodes to the cathodes, creating a conductive environment at a temperature of approximately 950° C. The alumina is then broken down by the electric current into pure aluminium, which settles at the bottom of the pot.

The pots are arranged in long lines, one next to the other, in a long rectangular building. These buildings can contain anywhere from 1 to 500 pots, which are globally referred to as a potline. A typical aluminium smelter can have many potlines and often have hundreds of pots operating in the same facility.

As the electrolytic reduction process is a chemical reaction, managing the quantities of reagents is vital. Ideally, alumina is added, and aluminium extracted in a continuous and controlled manner to maintain perfect equilibrium of concentrations. However, from an operational and logistical standpoint, this is not feasible for many reasons including cost of labor, efficiency, and safety.

Logistical and operational limitations dictate the frequency at which the pots can be syphoned. Each time a pot is syphoned, thousands of kilograms of aluminium are removed, removing a large quantity of thermal energy, lowering the level of metal in the pot and hence, potentially destabilising the reaction.

In the systems of the PRIOR ART, the extraction of molten aluminium is performed using vacuum pressure in a sealed receptacle to create suction in a tube that is inserted in the pot. Aluminium is sucked up through the syphon pipe into an appropriate receptacle and then transported to a location where it can be treated or cast. The complexity of this operation provides difficulties against its automatization and consequently remain reliant on the availability and the cost of skilled labour. The receptacles, usually crucibles, can be manipulated with large trucks or mobile overhead cranes. The ability to remove large amounts of metal reduces the number of tapping operations, and hence number of operators, necessary to accomplish the task, lowering costs. However, as mentioned above, the best case for pot efficiency is to remove the smallest amount of metal possible at a time, so that it more closely resembles a continuous, steady-state operation. Therefore, aluminium smelters must balance between reduced efficiency of the pot by extracting large amounts at once, or increased cost of labour to extract smaller amounts more frequently.

Furthermore, using crucibles to transport liquid aluminium is costly. Preheating of the inside surface of crucibles is required before molten metal can safely be introduced inside, as any moisture trapped between the surface and molten aluminium can cause projections and explosions. As the crucibles are used, and molten metal cools inside them, aluminium oxide and bath tend to precipitate and accumulate on the inner surfaces and must periodically be scraped out either manually or using expensive machinery. The removal of this precipitate also wears out the inner lining of refractory leading to its early replacement.

Referring to FIGS. 13 to 19, these figures are depicting embodiments of system therefor.

The system of the present innovation provides a solution to remove the intermediate molten metal transport receptacle and replace it with AGVs 1 transporting sow moulds 3. The molten aluminium from the pots is transferred directly into the sow moulds 3 and is transported to the necessary subsequent locations using AGVs 1. Thus, all costs relevant to the use of crucibles and labourers to transfer metal from pot rooms to casting facilities is avoided.

This present system is integrated with the before described components, and together create a process for casting sows directly from the aluminium reduction cells. This is performed in a fully automated manner using AGVs 1 to transport the metal directly from where it is created in the pots to where it is a finished product ready to be transported and sold.

Concept variations are put forth and described below, explaining how to displace molten aluminium from the reduction cell to the sow mould 3.

Referring to FIGS. 13 to 16, these figures are depicting a first embodiment.

To fully automate the process, AGVs 1 and robots are utilised. The first embodiment uses mobile extraction device 15 consisting in an AGV on which a robot is mounted. The mobile extraction device 15 moves from one pot to the next and extracts the prescribed amount of aluminium. This mobile extraction device 15 can do the skimming directly after the sow 4 is poured and can be battery powered, provided charging stations throughout the pot room are available.

Extraction from the pots can be performed using a variety of tools on the robot to suit different types of pots. One variation example is to use a robot-controlled ladle 16 to scoop up metal and pour it into the mould. Another is to use a syphoning tool 17 which operate with negative pressure to extract out a determined quantity of metal and direct the liquid metal out into the mould.

Working in conjunction with the mobile extraction device 15, AGVs 1 transporting sow moulds 3 move about the pot room and allow their respective moulds 3 to be filled. These filled moulds 3 can then be "integrated" into the sow casting process by the AGVs 1, as previously described herein.

Figure 17:
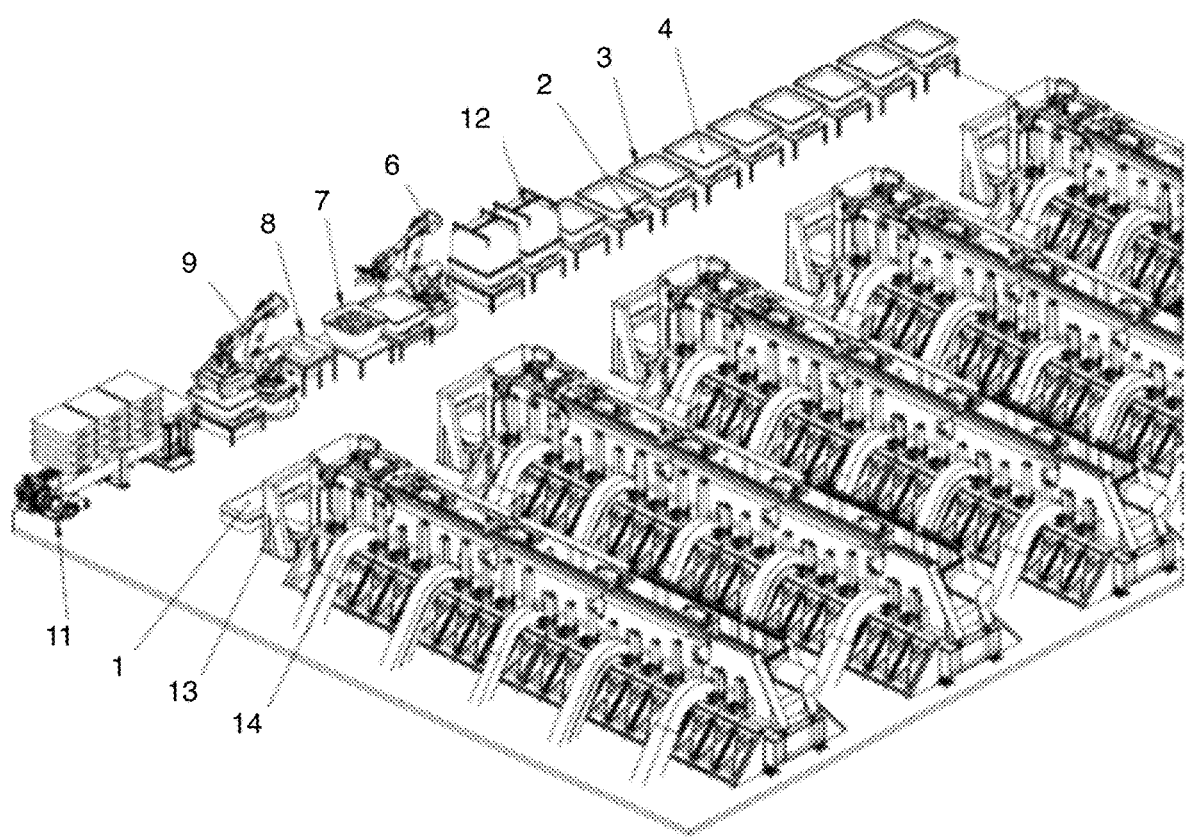
FIG. 17 is a depiction of an exemplary reduction cell to mould in accordance with a second concept variation.
Figure 18:
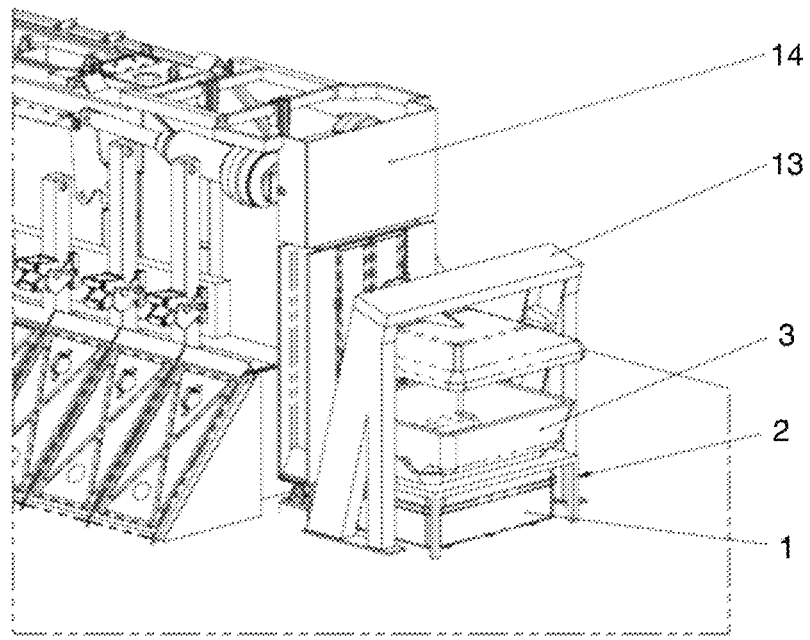
FIG. 18 is a depiction of a syphoning device in an open position in accordance with a second concept variation.
Figure 19:
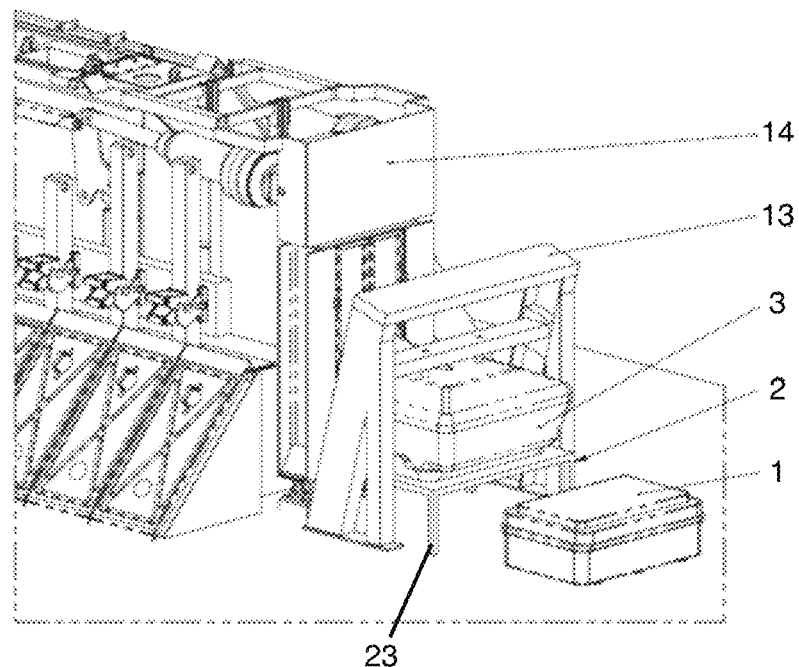
FIG. 19 is a depiction of the syphoning device of FIG. 18 in a closed position in accordance with a second concept variation.

Referring to FIGS. 17 to 19, these figures are depicting a second embodiment.

This second embodiment incorporates an automatic syphoning device 13 that uses the sow mould 3 as a recipient. This device can be mounted on an AGV 1 or be incorporated into the pot tending overhead cranes already in use in many smelters or otherwise. An AGV 1 brings the mould 3 to the pot. This device lowers, seals on the surface of the moulds, and syphons metal from the pot directly into the sow.

Referring to FIGS. 28A, 28B and 29, another concept involves that a mobile extraction device 38 (depicted on FIG. 29 as an extraction device, e.g., extraction device 37 on FIGS. 28A and 28B, mounted on an AGV, see moving AGV 1 of FIG. 28A) is using a molten metal pump 35. The mobile extraction device 38 is designed to move from one pot to another on a mobile device such as an AGV 1, a manned vehicle or an overhead crane.

The pump inlet tube (not identified) is inserted in the tapping hole (not identified) of the pot. Doing so, the outlet of the molten metal pump 35 is angled in a way that leaves space for an AGV 1 to bring an empty mould 3 to be filled.

Metal pump preheaters 36 are used to ensure that no moisture is present on the pump tube before being inserted into the pot.

A difference with systems of the PRIOR ART is that the receptacle for transport is omitted by using sow moulds 3 instead. Once the necessary amount to fill a sow is removed from the pot, the cover sealing the sow 4 is then lifted and the AGV 1 can bring the filled mould 3 to the next station. Many moulds 3 can be filled before moving over to the next pot. Hence, the amount of metal being removed from each pot is in sow sized increments.

The described process removes the need for crucibles altogether and can be fully automated.

It is not further necessary to equip an entire smelter with these machines; only the amount necessary to meet the sow casting needs for that particular smelter.

The described concept variations differ from the machines of the PRIOR ART in at least one of the following characteristics:

Removing the need for crucibles and/or crucible transport vehicles;
Preventing monopolising floor space in a cast house, and potentially removing the need for a cast house;
Decreasing volumes while increasing frequency of metal removed;
Automating removal of molten aluminium from pots;
Improving safety through automatization of the process; and
Having option of performing the sow casting process close to the pots using the same AGV.

AGV Adaptations

In order to operate the system of the present innovation, improvements have been performed over equipment of machines of the PRIOR ART as can be understood from the description before, e.g., to preheating stations. Some of these improvements specific to AGVs are furthermore provided below in more details.

Automated Guided Vehicles are becoming more common in industries where moving objects around a factory is required. With increased automation and increased payloads, the uses for such autonomous equipment are increasing. Companies have previously provided solutions for pallet transporting using AGVs capable of moving packed pallets from one location to another. AGVs of the PRIOR ART, however, are generally not adapted for operation in the hostile environment of an aluminium smelter or recycling facility where high and low temperatures may be present, there is potential exposure to molten metal and other contaminants are omnipresent both on surfaces and in the air.

Therefore, AGVs 1 designed for the system of the present innovation features innovations that allow operation in this hostile environment. AGVs 1 are equipped with improvements that ensure that such autonomous vehicles are able to undergo conditions of aluminium facilities, whether they be cast rooms, pot lines, recycling centres or other locations where liquid aluminium may be present.

Figure 21:
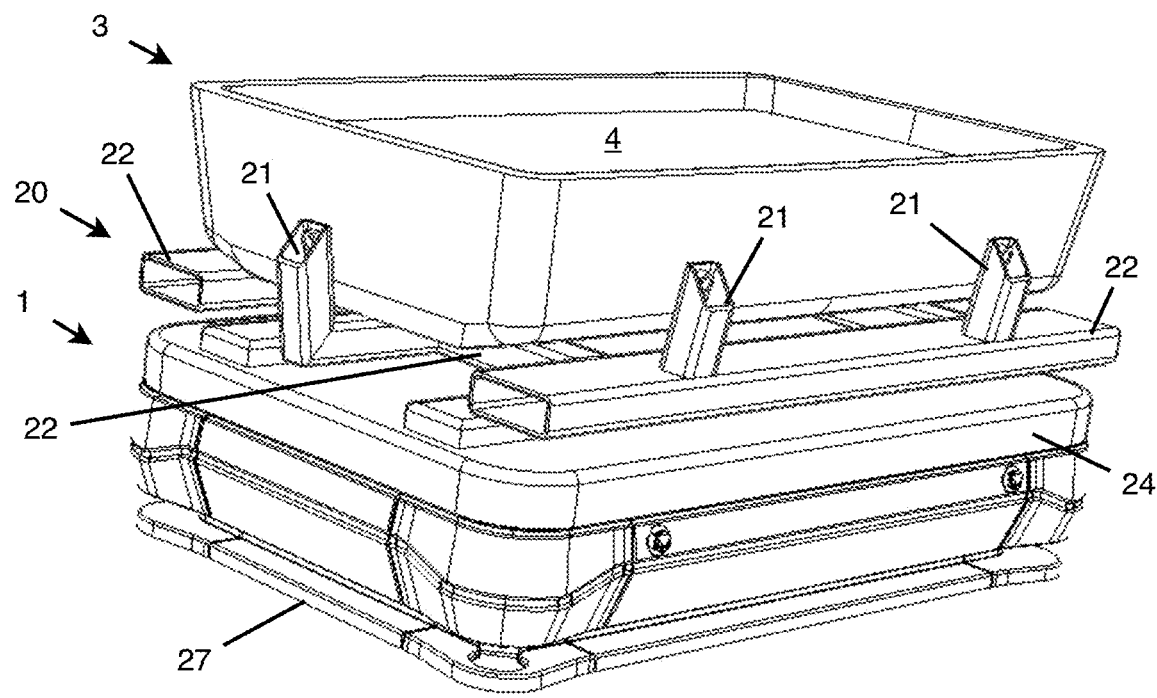
FIG. 21 is an elevation oblique perspective view of an Automated Guided Vehicle (AGV) holding a mould on a support structure in accordance with an embodiment.
Figure 22:
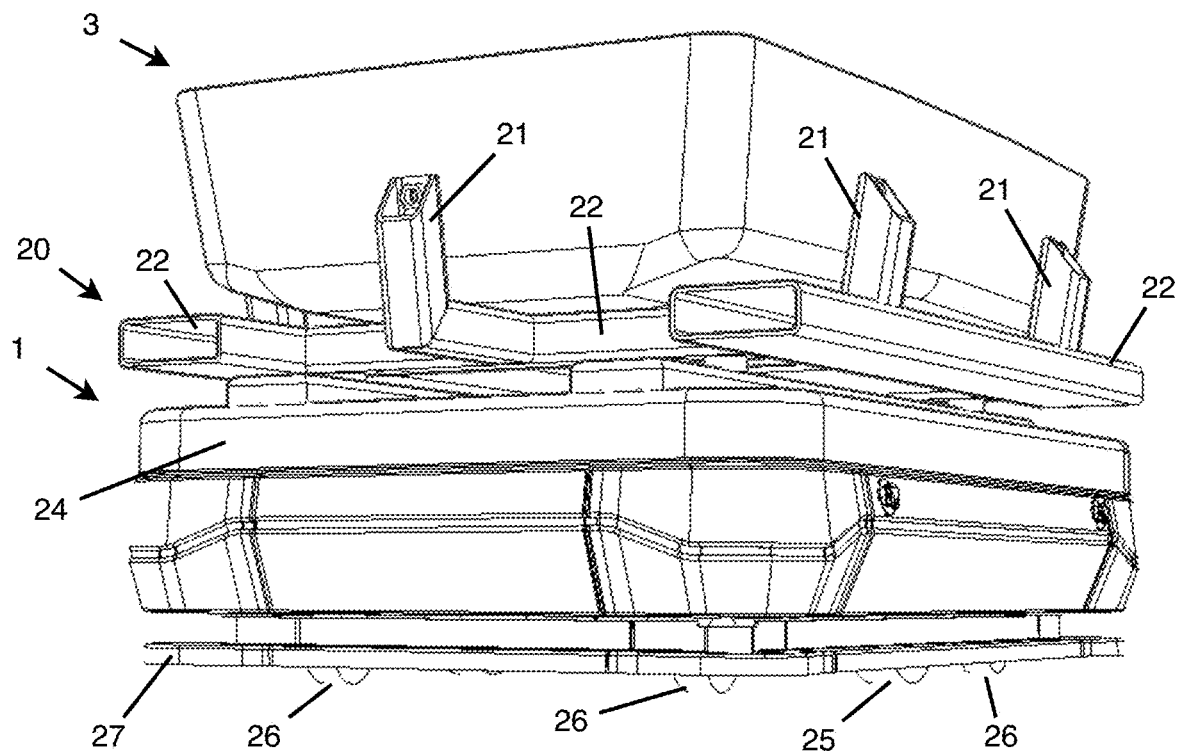
FIG. 22 is a side oblique perspective view of an AGV holding a mould on a support structure in accordance with an embodiment.

Referring to FIGS. 21 to 23, in a first embodiment, AGVs 1 can accurately pick up, put down and manipulate moulds 3. AGV 1 are equipped with a support structure 20 mountable to their top, comprising prongs 21 extending on the four sides of the space adapted to receive a mould 3 and thereby hindering horizontal movement of the held mould 3. The support structure 20 further elevates and space out the mould 3 from the top of the AGV 1, limiting heat transmitted to the AGV 1 by the mould 3 when filled with metal. Since the content of the mould 3 when held by an AGV 1 is between 850° C. at the pouring and about 660° C. when solidification begins, the external face of mould 3 may increase to about 500° C., AGVs 1 need to be adapted therefor such that limited heat is transmitted to the AGVs 1.

According to an embodiment, the support structure 20 comprises framing 22 providing space therein or underneath such that forks of a forklift may take place therein or underneath and lift the support structure 20 and potentially a mould 3 hold thereon to free the AGV 1 from the mould 3.

Figure 30:
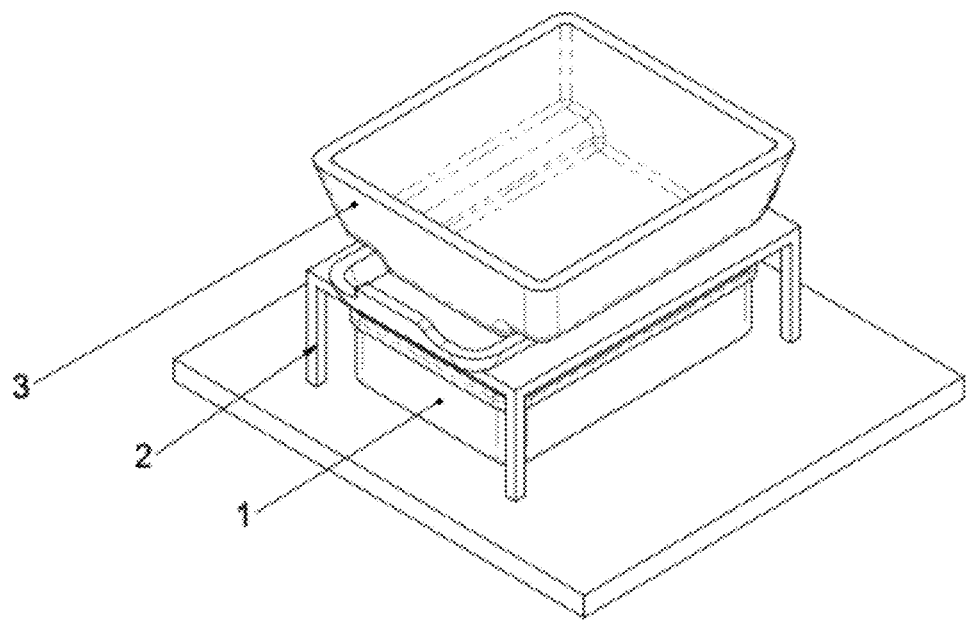
FIG. 30 is an isometric view of a mould on a support table and an AGV in accordance with an embodiment in accordance with an embodiment.
Figure 31:
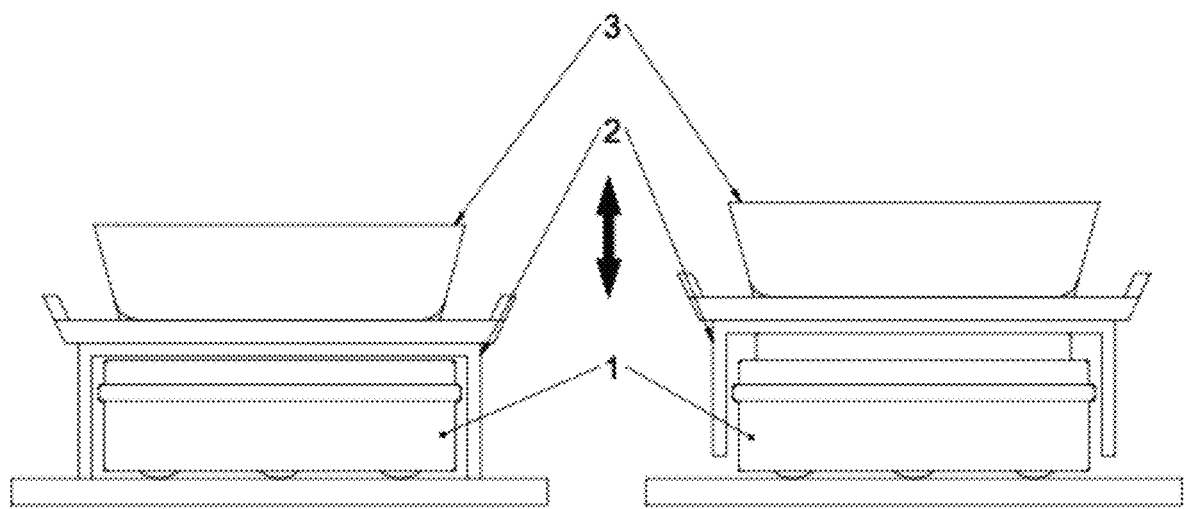
FIG. 31 is a front view of a mould on a support table with a AGV moved thereunder respectively in a lowered position and a raised position lifting the support table off from the ground.

Referring additionally to FIGS. 30 and 31, according to embodiments, support structure 20 comprises members such as legs 23 (see legs 23 in FIG. 19, of e.g., support table 2 of FIG. 19, FIG. 30 and FIG. 31) providing clearance underneath allowing an AGV 1 to take place under the mould 3. AGV 1 comprise a lifting platform able to lift the support structure 20 to lift the legs above ground such that the AGV 1 can get hold of and move the combination of the support structure 20 and mould 3 between stations and leave support structures 20 autonomously. FIG. 31 depicts at the left an AGV 1 moved underneath a support table 2 prior to lifting the support table 2, while at the right an AGV 1 under a support table 2 with the support table lifted ready to be moved to another station.

According to an embodiment, AGVs 1 comprise a deflecting shield 24 extending from the top at an outwardly slope toward the ground over a portion of the height of the AGV 1. Function of the deflecting shield 24 consists of protecting the body of the AGV 1 from potential spill of liquid metal and deflecting radiant heat from the mould away from the AGV 1.

AGVs 1 according to an embodiment, AGVs 1 are adapted to move payloads of about 1200 kg or more. AGVs are therefore equipped with two independently motorized fixed-direction driving wheels 25 and four non-motorized wheels 26 wherein difference in speed and direction between the motorized driving wheels 25, aka ground-contacting driving wheels, allows to drive and steer AGVs 1, and the non-motorized ground-contacting wheels 26 located about the corners of the AGV 1 provides stability thereto.

A e.g., broom-type skirt 27 is mounted to the bottom edge of the AGVs 1 operating as a squeegee and thereby isolating the wheels 25, 26 from debris that may be present on the floor.

According to an embodiment, AGVs 1 are equipped with an autonomous cooling system (not depicted). AGVs are equipped with temperature sensor(s) (not depicted) and air blowers (not depicted) designed to cool down sensible components of the AGVs 1, e.g., battery (not depicted), driving motors (not depicted), lifting motor(s) (not depicted), controller (not depicted), etc.

According to an embodiment, the blowers of AGVs 1 are operated when triggered by a lower temperature when AGVs are charging, e.g., physically connected or wirelessly charging, for instance inductive charging, resonance charging or radio-frequency charging, optimizing energy management between energy storage and energy instant usage.

According to an embodiment, the environment is equipped with cooling assemblies (not depicted), such as under-grills and close-to-the-floor blowers designed to force cooling air to AGVs 1 such that AGVs 1 are cooled down without cooling down the moulds 3.

According to an embodiment, AGVs 1 are also designed for safety, and interaction with operators and surrounding equipment to reduce risks and associated hazards. Safety-related components are mounted to the AGVs 1 such as proximity sensors (not depicted), radars (not depicted), optical sensors (not depicted), and contact sensors (not depicted), emergency stops (not depicted), and radio communication components (not depicted).

According to an embodiment, AGVs 1 of the present system are further equipped with accelerometers (not depicted) such as measuring effect of movement over the liquid metal, and thus ensuring smooth transportation of liquid metal within moulds 3 without causing spills or excessive waves during displacements.

The described embodiment of such AGVs 1 differs from AGVs of PRIOR ART in at least one of the following characteristics:
  Protecting components of AGVs from environmental heat and environmental dust specific to the hostile environment associated with casting of sow from liquid metal;
  Protecting components of the AGVs from splashes of liquid metal;
  Being able to transport liquid metal in an open container without spilling, through at least control of accelerations/decelerations/turning, and emergency stops;
  Being able of cooling itself down for battery and electric/electronics components, allowing AGVs to approach various equipment at very high temperatures;
  Being able to operate, charge and be maintained reliably and safely within a casting environment; and
  Moving, steering and maintaining its stability and the stability of moulds using at least 4 contact points and 2 driving points.

Mould Design

Additionally, some improvements specific to moulds 3 are furthermore provided below in more details.

Referring to FIGS. 24 and 25, moulds 3, in order to allow automation and easy demoulding, feature slightly outwardly sloped side walls 31 allowing, at a demoulding station, to demould the sow from the mould 3 with suction. Thus, moulds 3 must feature no inward protrusion or shape on the interface face of the walls below the maximum filling level.

According to an embodiment, moulds 3 are used with a removable spill-breaking ring 28 (with a cross-section of a portion of the spill-breaking ring 28 depicted in FIG. 25) having a shape depicted designed to redirect waves of liquid metal hitting the spill-breaking ring 28 toward the center of the mould 3. The exemplary removable spill-breaking ring 28, having the same dimension as the ledge 29 of the mould 3, is designed to be placed on the ledge 29 of the mould 3 with the deflecting face 30 extending inward from the ledge 29 of the mould. The spill-breaking ring 28 is designed to be removed before or when demoulding the sows 4 from the mould 3, and put in place over the ledge 29 of the mould 3 before filling the mould 3.

According to an embodiment, moulds 3 are made of cast steel of between 50 and 80 mm of thickness.

According to an embodiment, a portion of the exterior of the floor of the moulds 3 is covered with some insulating material in order to limit heat transmitted to the AGVs 1.

According to an embodiment, moulds 3 are designed to undergo forced cooling at cooling stations, including air cooling and indirect water cooling (aka water-cooled components in contact with the moulds at a cooling station.

Method of Operation

Figure 26:
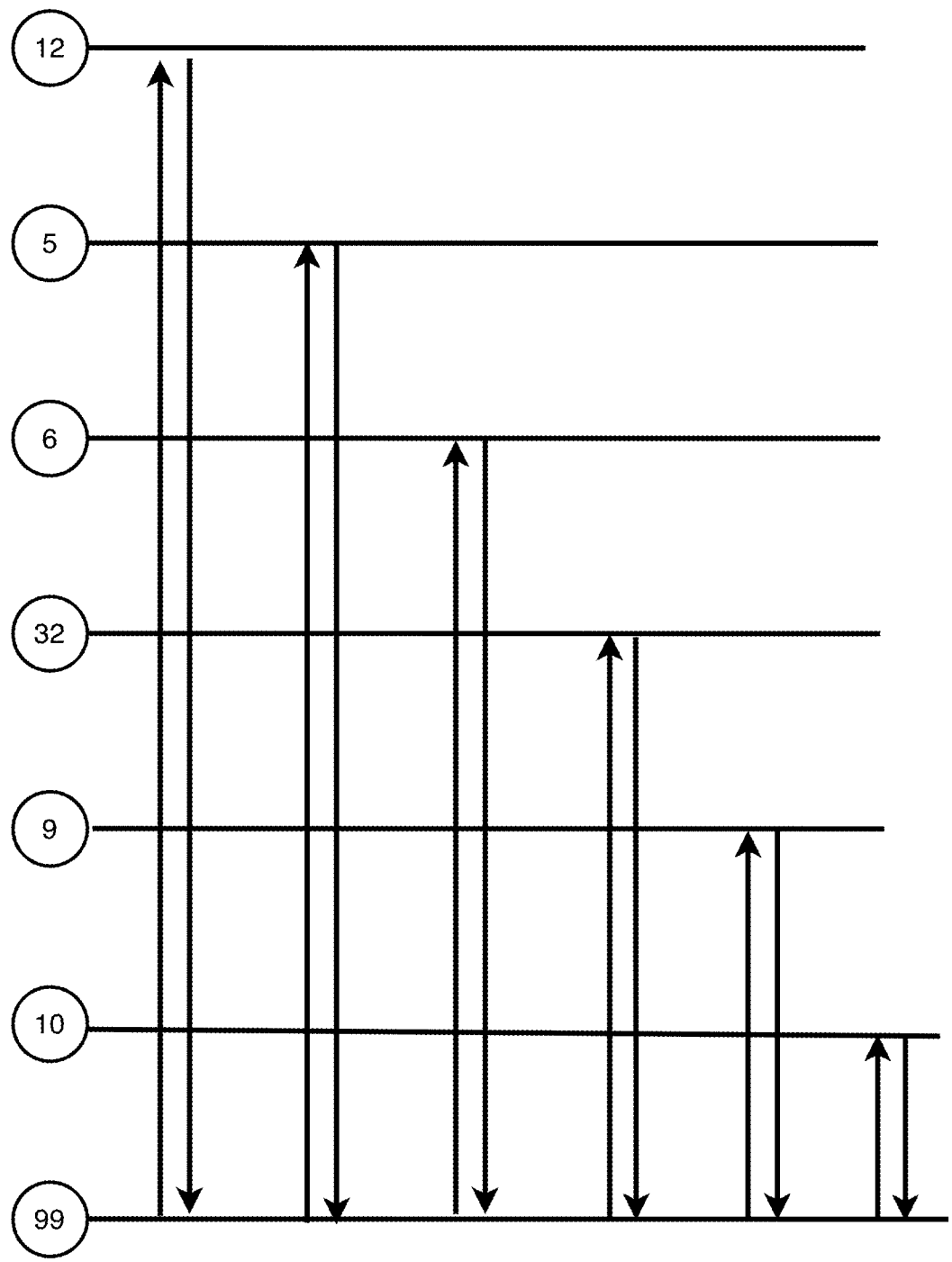
FIG. 26 is a UML sequence diagram of operation of AGVs in the system in accordance with an embodiment.

Referring now to FIG. 26, to be considered considering, e.g., FIG. 26, a UML sequence diagram depicts the present method and stations involved therein.

The UML sequence diagram lists stations involved in the process and visited by AGVs 1, namely preheating station(s) 12, pouring station(s) 5, skimming station(s) 6, cooling station(s) 32, demoulding station(s) 9, and weighing and marking station(s) 10, with passages of the AGVs through the general station-free area (wherein a portion in identified through ref. 99 on FIG. 20) to move between stations.

It is worth noting that the UML sequence diagram is a tool to illustrate the routes and does not limit the stations or actors involved therein to the list provided therethrough. For instance, additional stations such as charging stations, storage and maintenance stations, are contemplated to be added to the UML sequence diagram and other figures therethrough. Furthermore, passive actors that are moulds 3 and potentially support structures 20 are not depicted therethrough since movements of AGVs 1 are mostly intended to move moulds 3 and support structures 20 between stations. Finally, components of stations that may be considered actors, e.g., skimming robots of skimming stations 6, are not depicted for simplicity since dedicated to a single task and having a single location associated therewith.

Figure 27:
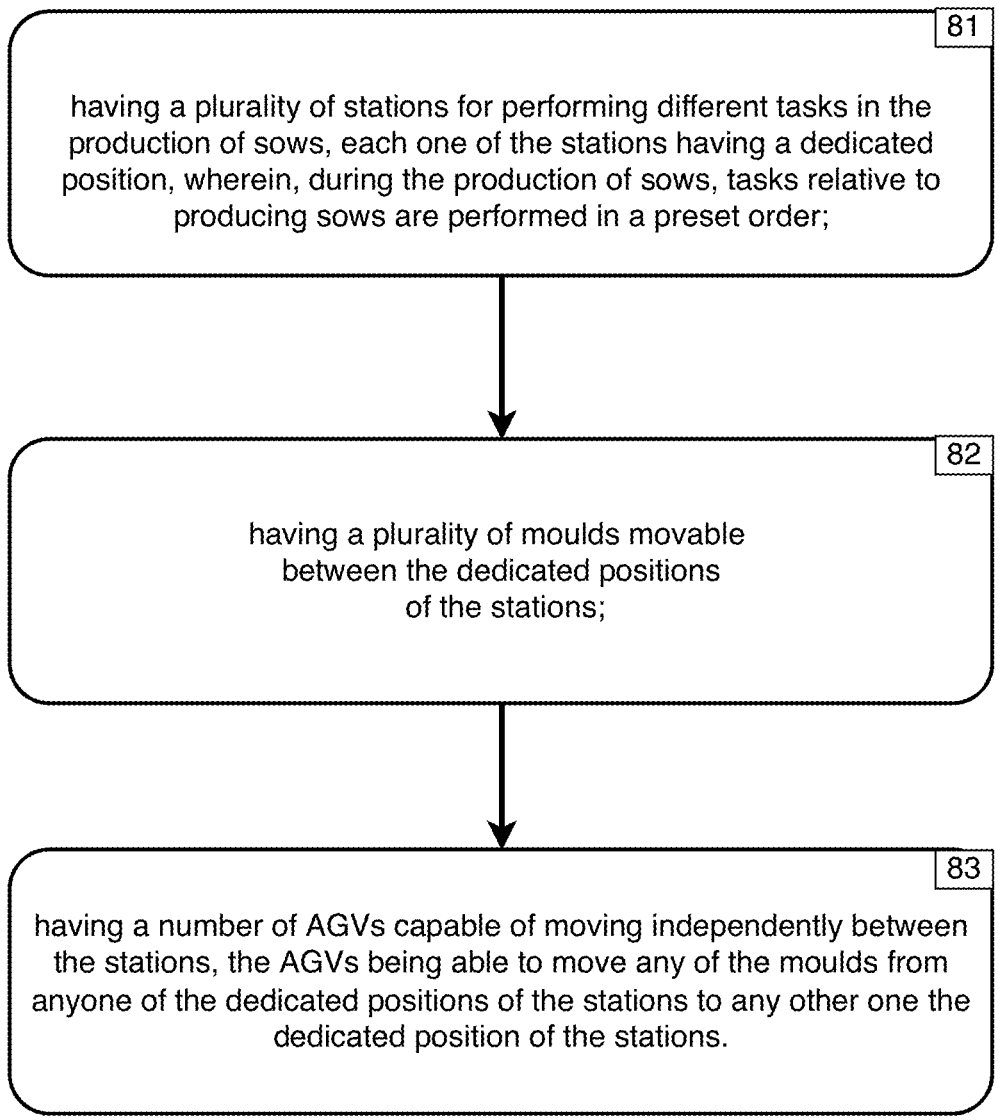
FIG. 27 is a flow chart of a method of operation of the system in accordance with an embodiment.

Accordingly, referring to FIG. 27, a method for producing sows from liquid metal poured in moulds, the method comprises:
- 81: having a number of at least three stations for performing different tasks in the production of sows, each one of the stations having a dedicated position and operating at a dedicated rate in term of number of sows per time unit, wherein, during the production of sows, tasks relative to producing sows are performed in a preset order;
- 82: having a plurality of moulds movable between the dedicated positions of the stations; and
- 83: having a number of Automated Guided Vehicles (AGVs) capable of moving independently between the stations, the AGVs being able to move any of the moulds from any one of the dedicated positions of the stations to any other one the dedicated position of the stations.

The method may comprise having a first AGV free of moulds moving to a first one of the stations, getting hold of the mould located at the first station, and moving the mould to a second one of the stations based on the preset order;

The method may comprise having the first AGV releasing the mould at the second station and moving away from the second station free of moulds.

The method may comprise having at a moment a first number of moulds located at the first station, a second number of moulds located as the second station, and a third number of moulds located at the third station, wherein at least one of the first number, the second number and the third number is at least 2.

The method may comprise having less AGVs than the plurality of moulds, e.g., at a ratio of between 1 AGV per 5 moulds and 1 AGV per 25 moulds.

The method may comprise having at a buffer station wherein a first one of the moulds is moved therein before a second one of the moulds, with the first mould leaving the buffer station after the second mould leaving the buffer station.

The method may comprise having a first AGV moving a first mould to the first station, and a second AGV moving the first mould away from the first station.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for producing sows from liquid metal cast into moulds, the method comprises:
   providing a plurality of stations, each one of the stations adapted for performing one of different tasks in the producing of the sows, each one of the stations having one or more dedicated positions and operating at a dedicated rate in terms of number of sows per time unit, wherein, during the producing of the sows, tasks relative to producing sows are performed in a preset order;
   providing a plurality of moulds movable independently to one another between the one or more dedicated positions of the stations;
   providing support structures, each one of the support structures adapted to hold at least one of the plurality of moulds, the support structures comprising members configured to provide space underneath; and
   providing a plurality of Automated Guided Vehicles (AGVs) capable of independently moving between the stations, the AGVs being able to move one of the moulds from any one of the dedicated positions of the stations to any other one of the dedicated positions of the stations,
   wherein the space underneath the support structures allows any one of the AGVs to take place underneath.

2. The method of claim 1, wherein at least one of the AGVs holds one of the moulds located at a first one of the one or more dedicated positions, moves a held mould to a second one of the one or more dedicated positions, and releases the held mould at the second one of the one or more dedicated positions.

3. The method of claim 1, further comprising having, at a first time, a first number of the moulds located at a first one of the stations, a second number of the moulds located at a second one of the stations, and a third number of the moulds located at a third one of the stations, wherein at least one of the first number, the second number and the third number is at least 2.

4. The method of claim 1, further comprising having fewer AGVs than the plurality of moulds.

5. The method of claim 1, further comprising having a buffer station wherein a first one of the moulds is moved therein after a second one of the moulds, and the first one of the moulds is leaving the buffer station before the second mould.

6. The method of claim 1, further comprising having a first one of the AGVs moving a first one of the moulds to a first one of the stations and releasing the first mould at the first one of the stations, and a second one of the AGVs getting hold of the first mould at the first station and moving the first mould away from the first station.

7. The method of claim 1, wherein the AGVs comprise a raising top, wherein, by raising and lowering the top, the AGVs are able to get hold of and release the moulds.

8. The method of claim 1, wherein the AGVs comprise at least two ground-contacting driving wheels and at least four additional ground-contacting wheels.

9. The method of claim 8, wherein the at least two ground-contacting driving wheels of the AGVs are independently motorized.

10. The method of claim 9, wherein the at least two ground-contacting driving wheels of the AGVs are adapted to selectively drive in opposite directions.

11. The method of claim 1, wherein one of the stations comprises a robot controlled to perform predetermined movements.

12. The method of claim 1, wherein at least some of the support structures comprise upwardly extending prongs for hindering horizontal movements of a held one of the moulds.

13. The method of claim 1, wherein the AGVs hold the held mould by lifting one of the support structures holding the held mould.

14. The method of claim 1, wherein the AGVs hold the held mould by lifting one of the support structures such that the members lose contact with ground.

15. The method of claim 1, wherein a first one of the support structures, when held by a first one of the AGVs, spaces apart a first one of the moulds held in the first support structure from the first AGV.

16. The method of claim 1, wherein the AGVs and the stations are operated automatically.

17. The method of claim 1, wherein one of the stations is a preheating station comprising a closable heated internal compartment, wherein the internal compartment is closed between two tasks of preheating a first one and a second one of the moulds, thereby saving energy.

18. The method of claim 1, wherein the stations take place in an environment having a layout, the layout comprising a station-free area connecting the stations and used by the AGVs to move between stations.

19. The method of claim 1, further comprising setting up a first one of the AGVs in a charging state, and cooling up the first AGV during the charging state.

20. A method for producing sows from liquid metal cast into moulds, the method comprises:

providing a plurality of stations for performing different tasks in the producing of the sows, each one of the stations having one or more dedicated positions and operating at a dedicated rate in terms of number of sows per time unit, wherein, during the producing of the sows, tasks relative to producing sows are performed in a preset order;

providing a plurality of moulds movable independently between the one or more dedicated positions of the stations;

providing support structures on which are individually placed a held one of the moulds, wherein each of the support structures comprises upwardly extending prongs for hindering horizontal movements of the held one of the moulds; and providing a plurality of Automated Guided Vehicles (AGVs) capable of independently moving between the stations, the AGVs being able to move one of the moulds from any one of the dedicated positions of the stations to any other one of the dedicated positions of the stations, wherein the support structures comprise members configured to provide space underneath for any one of the AGVs to take place underneath.

* * * * *